US012738975B2

(12) United States Patent
Liu et al.

(10) Patent No.: US 12,738,975 B2
(45) Date of Patent: Sep. 15, 2026

(54) SYSTEMS AND METHODS FOR DETERMINING BIT LOADING PROFILES FOR CABLE MODEMS

(71) Applicant: Avago Technologies International Sales Pte. Limited, Singapore (SG)

(72) Inventors: Hong Liu, Irvine, CA (US); Thomas Kolze, Phoenix, AZ (US); Roger Fish, Superior, CO (US); Gordon Yong Li, San Diego, CA (US); Hau Tran, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 19/042,292

(22) Filed: Jan. 31, 2025

(65) Prior Publication Data

US 2026/0074743 A1 Mar. 12, 2026

Related U.S. Application Data

(60) Provisional application No. 63/694,707, filed on Sep. 13, 2024, provisional application No. 63/693,158, filed on Sep. 10, 2024, provisional application No. 63/691,619, filed on Sep. 6, 2024.

(51) Int. Cl.
*H04B 3/46* (2015.01)
*H04L 12/28* (2006.01)

(52) U.S. Cl.
CPC .......... *H04B 3/46* (2013.01); *H04L 12/2801* (2013.01)

(58) Field of Classification Search
CPC .............................. H04B 3/46; H04L 12/2801
USPC .......................................................... 375/222
See application file for complete search history.

(56) References Cited

U.S. PATENT DOCUMENTS

2010/0020896 A1 1/2010 Willems et al.
2014/0177750 A1* 6/2014 Kolze ...................... H04L 1/24 375/295
2014/0301734 A1* 10/2014 Fang .................. H04J 14/0307 398/115
2017/0141887 A1 5/2017 Garcia et al.
2018/0262412 A1 9/2018 Hanks et al.
(Continued)

OTHER PUBLICATIONS

Data-Over-Cable Service Interface Specifications DOCSIS? 3.1 “Physical Layer Specification” dated Apr. 19, 2023.
(Continued)

*Primary Examiner* — Fitwi Y Hailegiorgis
(74) *Attorney, Agent, or Firm* — Foley & Lardner LLP

(57) ABSTRACT

In some implementations, a system may include one or more processors configured to identify a set of bit loading profiles and respective target bit rates of the plurality of cable modems (CMS). The one or more processors may determine respective average bit rates of the plurality of CMs, determine, using the set of bit loading profiles and the respective average bit rates of the plurality of CMs, a plurality of sets of CMs having a first order of sets. For each set of CMs in the first order, the one or more processors may determine, based at least on respective target bit rates of the CMs in the set, a plurality of subsets of CMs having a second order of subsets, and for each subset in the second order, determine, from among the set of bit loading profiles, one or more bit loading profiles for corresponding CMs in the subset.

20 Claims, 15 Drawing Sheets

800

Identifying, by one or more processors, a set of bit loading profiles and respective target bit rates of a plurality of CMs, wherein a target bit rate of a CM is determined using a service level of the CM 802

Determining, by the one or more processors, respective average bit rates of the plurality of CMs, wherein an average bit rate of a CM is an average net bit rate per subcarrier of the CM 804

Determining, by the one or more processors, using the set of bit loading profiles and the respective average bit rates of the plurality of CMs, a plurality of sets of CMs having a first order of sets 806

For each set of CMs in the first order, determining, by the one or more processors, based at least on respective target bit rates of the CMs in the set, a plurality of subsets of CMs having a second order of subsets, and for each subset in the second order, determining, by the one or more processors, from among the set of bit loading profiles, one or more bit loading profiles for corresponding CMs in the subset 808

(56) References Cited

U.S. PATENT DOCUMENTS

| | | | |
|---|---|---|---|
| 2021/0091989 | A1 | 3/2021 | Zaltsman et al. |
| 2022/0239758 | A1 | 7/2022 | Klein et al. |

OTHER PUBLICATIONS

Non-Final Office Action on U.S. Appl. No. 19/040,279 DTD Jun. 1, 2026.

Notice of Allowance on U.S. Appl. No. 19/040,275 DTD Jun. 5, 2026.

* cited by examiner

500

650

800

SYSTEMS AND METHODS FOR DETERMINING BIT LOADING PROFILES FOR CABLE MODEMS

CROSS-REFERENCE TO RELATED APPLICATIONS

This application claims the benefit of and priority to U.S. Provisional Patent Application No. 63/691,619 filed on Sep. 6, 2024, U.S. Provisional Patent Application No. 63/693,158 filed on Sep. 10, 2024 and U.S. Provisional Patent Application No. 63/694,707 filed on Sep. 13, 2024, which are incorporated herein by reference in their entirety for all purposes. U.S. patent application Ser. No. 19/040,275 filed on Jan. 29, 2025 is incorporated herein by reference in its entirety for all purposes.

FIELD OF THE DISCLOSURE

This disclosure generally relates to systems and methods for improving modulation/demodulation process of a communications system, including but not limited to systems and methods of determining bit loading profiles for at cable modems.

BACKGROUND

Cable operators have long held valuable the ability to estimate a signal-to-noise ratio (SNR) margin of downstream digital communications links at a cable modem (e.g., each cable modem in a plant or cable networks). The SNR margin in a cable modem refers to the difference between an actual signal strength and a minimum signal strength required to maintain a reliable connection, or any measure of the quality of the signal received by the cable modem. Specifically, cable operators have expressed the high value of the SNR Margin estimation capability developed for a cable television system defined by a standard like ITU-T J.83B. ITU-T J.83B also defines a standard for downstream cable transmission with single-carrier quadrature amplitude modulation (SC-QAM) with constellation sizes of 64-QAM and 256-QAM, and Forward Error Correction (FEC) which is a concatenated coding scheme. For example, upon installations or repairs of a cable modem (for customers), with a ITU-T J.83B-compatible SNR margin estimation tool, technicians can obtain an SNR margin estimate for the downstream link, and check if the cable modem achieves 3 dB or more of margin using the estimation tool the cable modem (to check if the cable modem has been successfully installed or repaired).

With the roll-out of data over cable service interface specifications (DOCSIS) 3.1 and Orthogonal Frequency-Division Multiplexing (OFDM) and new FEC thereof, many variations of bit loading are possible. For example, with DOCSIS OFDM, cable modem termination systems (CMTS) support 16 downstream profiles per OFDM channel, although individual cable modems typically only support four active profiles plus one transient profile (active or inactive) per channel.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
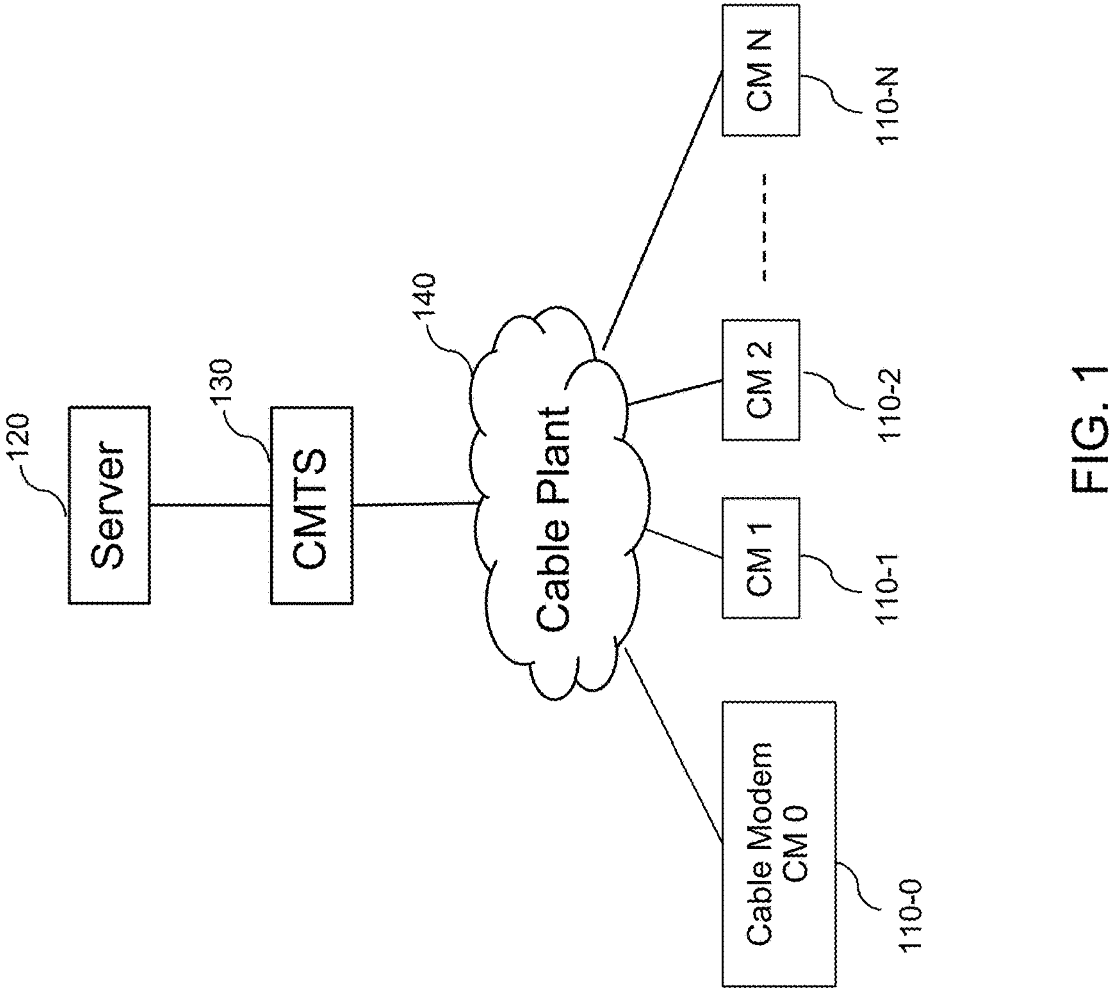
FIG. 1 is a diagram depicting an example communication environment with a plurality of cable modems and a server, according to one or more embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagram depicting an example communication environment 1000 with a plurality of cable modems 110-0, 110-1, . . . , 110-N, a server 120, a cable modem termination system (CMTS) 130, and/or a cable plant 140, according to one or more embodiments. Here, the term "cable modem" refers to a device that can function as a bridge between a local network and an internet service provider (ISP) using the same coaxial cable infrastructure that delivers cable television, a device that can convert (e.g., demodulate) data signals received from an ISP using the coaxial cable infrastructure into a format that devices in a local network (e.g., local area network (LAN)) can use, and convert (e.g., modulate) data signals from the LAN into an analog signal that can be transmitted to the ISP using the coaxial cable infrastructure, or any device that can connect a local network to the Internet using the same coaxial cable infrastructure. The term "cable modem termination system (CMTS)" refers to a system, device or equipment that is used by cable internet service providers to manage and facilitate communication between cable modems and the internet, is located in a cable company's headend or hubsite to provide data services such as cable internet or Voice over IP (VOIP) to cable subscribers, and/or enables communication with subscribers' cable modems. The term "cable plant" refers to a cable network, an HFC (hybrid fiber-Coaxial) cable network, or any physical infrastructure used for cable television and internet services. The cable plant may include all the cables, connectors, amplifiers, and other equipment used to deliver these services to customers. Each cable modem 110-0, 110-1, . . . , 110-N can include one ore more ports for the coaxial cable from an ISP, an Ethernet port to connect to a router or a computer in a local network, and/or additional ports for telephony services. Each cable modem 110-0, 110-1, . . . , 110-N can have configuration similar to configuration of a computing system 2000 in FIG. 2. The server 120 can have configuration similar to configuration of a computing system 2000 in FIG. 2. The server 120 may include a computing device (e.g., computing system 2000) and/or a cloud system. The cloud system refers to a system that can deliver one or more services over the Internet. The one or more services can include one or more services of infrastructure as a service (IaaS), platform as a service (PaaS), or software as a service (SaaS). The CMTS 130 may include a computing device (e.g., computing system 2000). The cable plant 140 may be a component in a connection between the server 120 and the cable modems 110-0, . . . 110-N. In some implementations, the cable plant may be a component in a connection between the CMTS 130 and the cable modems. In some implementations, the server 120 may include a downstream modulator for modulating downstream transmissions which the cable plant 140 conveys to the cable modems, which then perform demodulation of the downstream transmissions. In some implementations, the CMTS 130 may include a downstream modulator for modulating downstream transmissions which the cable plant 140 conveys to the cable modems, which then perform demodulation of the downstream transmissions. Each cable modem can transmit or receive data (e.g., telemetry data) to the server 120 and/or CMTS 130. For example, each cable modem can automatically collect and transmit data to the server for monitoring and analysis.

Figure 2:
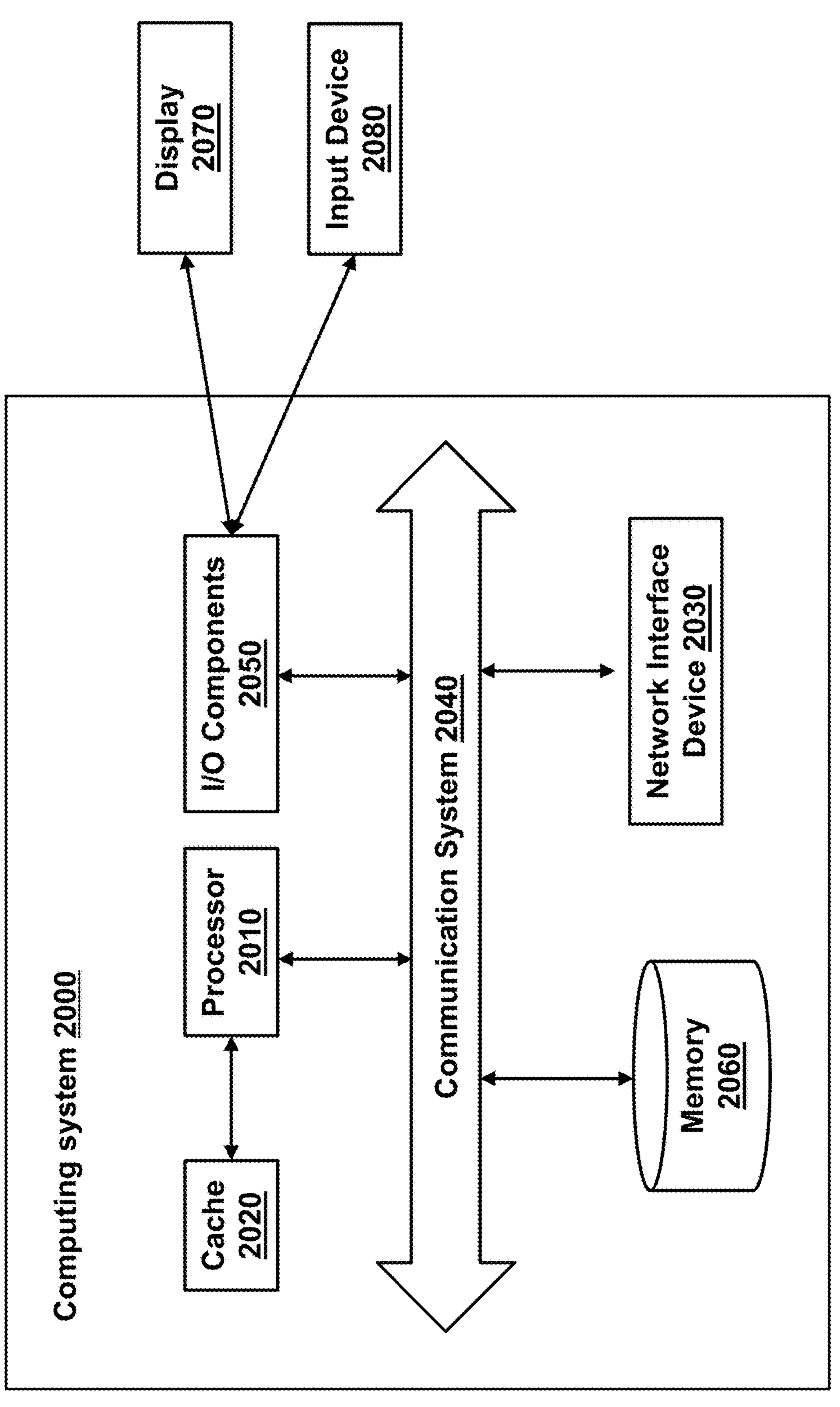
FIG. 2 is a schematic block diagram of a computing system, according to one or more embodiments.

FIG. 2 is a schematic block diagram of a computing system, according to an embodiment. An illustrated example computing system 2000 includes one or more processors 2010 in direct or indirect communication, via a communication system 2040 (e.g., bus), with memory 2060, at least one network interface controller 2030 with network interface port for connection to a network (not shown), and other components, e.g., input/output ("I/O") components 2050. Generally, the processor(s) 2010 will execute instructions (or computer programs) received from memory. The processor(s) 2010 illustrated incorporate, or are connected to, cache memory 2020. In some instances, instructions are read from memory 2060 into cache memory 2020 and executed by the processor(s) 2010 from cache memory 2020. The computing system 2000 may not necessarily contain all of these components shown in FIG. 2 and may contain other components that are not shown in FIG. 2.

In more detail, the processor(s) 2010 may be any logic circuitry that processes instructions, e.g., instructions fetched from the memory 2060 or cache 2020. In many implementations, the processor(s) 2010 are microprocessor units or special purpose processors. The computing device 2050 may be based on any processor, or set of processors, capable of operating as described herein. The processor(s) 2010 may be single core or multi-core processor(s). The processor(s) 2010 may be multiple distinct processors.

The memory 2060 may be any device suitable for storing computer readable data. The memory 2060 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 2000 may have any number of memory devices 2060.

The cache memory 2020 is generally a form of computer memory placed in close proximity to the processor(s) 2010 for fast read times. In some implementations, the cache memory 2020 is part of, or on the same chip as, the processor(s) 2010. In some implementations, there are multiple levels of cache 2020, e.g., L2 and L3 cache layers.

The network interface controller 2030 manages data exchanges via the network interface (sometimes referred to as network interface ports). The network interface controller 2030 handles the physical and data link layers of the OSI model for network communication. In some implementations, some of the network interface controller's tasks are handled by one or more of the processor(s) 2010. In some implementations, the network interface controller 2030 is part of a processor 2010. In some implementations, the computing system 2000 has multiple network interfaces controlled by a single controller 2030. In some implementations, the computing system 2000 has multiple network interface controllers 2030. In some implementations, each network interface is a connection point for a physical network link (e.g., a cat-5 Ethernet link). In some implementations, the network interface controller 2030 supports wireless network connections and an interface port is a wireless (e.g., radio) receiver or transmitter (e.g., for any of the IEEE 802.11 protocols, near field communication "NFC", Bluetooth, ANT, or any other wireless protocol). In some implementations, the network interface controller 2030 implements one or more network protocols such as Ethernet. Generally, a computing device 2050 exchanges data with other computing devices via physical or wireless links through a network interface. The network interface may link directly to another device or to another device via an intermediary device, e.g., a network device such as a hub, a bridge, a switch, or a router, connecting the computing device 2000 to a data network such as the Internet.

The computing system 2000 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 2000 may include an interface (e.g., a universal serial bus (USB) interface) for connecting input devices, output devices, or additional memory devices (e.g., portable flash drive or external media drive). In some implementations, a computing device 2000 includes an additional device such as a co-processor, e.g., a math co-processor can assist the processor 2010 with high precision or complex calculations.

The components 2090 may be configured to connect with external media, a display 2070, an input device 2080 or any other components in the computing system 2000, or combinations thereof. The display 2070 may be a liquid crystal display (LCD), an organic light emitting diode (OLED) display, a flat panel display, a solid state display, a cathode ray tube (CRT) display, a projector, a printer or other now known or later developed display device for outputting determined information. The display 2070 may act as an interface for the user to see the functioning of the processor(s) 2010, or specifically as an interface with the software stored in the memory 2060.

The input device 2080 may be configured to allow a user to interact with any of the components of the computing system 2000. The input device 2080 may be a plurality pad, a keyboard, a cursor control device, such as a mouse, or a joystick. Also, the input device 2080 may be a remote control, touchscreen display (which may be a combination of the display 2070 and the input device 2080), or any other device operative to interact with the computing system 2000, such as any device operative to act as an interface between a user and the computing system 2000.

In one aspect, with the roll-out of data over cable service interface specifications (DOCSIS) 3.1 and Orthogonal Frequency-Division Multiplexing (OFDM) and new FEC thereof, many variations of bit loading are possible. For example, with DOCSIS OFDM, CMTS supports 16 downstream profiles per OFDM channel, although individual cable modems typically only support four active profiles plus one transient profile per channel. Here, the "bit loading" refers to a technique used in communication systems to optimize the transmission of data over a channel by adjusting the number of bits (e.g., constellation size) transmitted on each subcarrier based on the signal-to-noise ratio (SNR) of that subcarrier or any other metrics. The "profile" (also referred to as "bit profile" or "bit loading profile") refers to a specific configuration (e.g., number of bits that can carry traffic, modulation orders, constellation density, constellation size, etc.) for each subcarrier within an OFDM channel, or a configuration that determines how many bits are transmitted on each subcarrier within an OFDM channel. Because the DOCSIS specification can only support 16 bit loading profiles per OFDM channel, a system cannot provide profiles customized for each cable modem if there are many cable modems (e.g., the number of cable modem is greater than 16), and one or more bit loading profiles must be shared by cable modems. It would be difficult to provide customized bit loading profiles for a plurality of cable modems to achieve their respective performance goals (e.g., target performance, target bit rate, etc.)

To solve these problems, systems and methods according to some embodiments of the present disclosure can determine bit loading profiles for a plurality of cable modems (CMs) using a group segmentation of a plurality of CMs. In some implementations, a system (e.g., server 120 in FIG. 1 or server 320 in FIG. 3) can divide CMs into a plurality of subsets (e.g., four quadrants) based on customized bit rates of the CMs (e.g., a net bit rate per subcarrier that a CM can achieve) compared with capacity requests for the CMs (e.g., a target bit rate per subcarrier of a CM).

Here, the "net bit rate" (also referred to as "bit rate") of a CM refers to the total number of bits transmitted per second, excluding any overhead (e.g., those used for error correction, signaling, and other protocol overheads). The "subcarrier" of a CM refers to a smaller frequency channel within a larger OFDM channel, or a portion of a channel that can carry a portion of the overall data such that the combination of all subcarriers forms the complete OFDM signal. The "target bit rate" of a CM refers to a desired data transmission rate that the CM aims to achieve. The target bit rate of a CM can be influenced by various factors, including the SNR of a channel, the modulation scheme used in the CM, the overall network conditions, and/or a service level of the CM. The "service level" of a CM refers to signal levels, SNR, modulation schemes, or any quality and performance metrics that the CM must meet to ensure reliable and efficient data transmission. The service level of a CM can be determined based on a request by a customer (e.g., a capacity request, or a request for capacity or performance of the CM).

In some implementations, the system can divide a plurality of CMs into four quadrants with an x-axis of channel impairment level and a y-axis of service level (e.g., target bit rate). The "quadrants" refers to four regions of a Cartesian coordinate system, each bounded by two half-axes. The "channel impairment" refers to any factor that degrades the quality of a signal as it travels through a communication channel, or any factor that degrades the signal's strength, clarity, and overall integrity, leading to errors and reduced data transmission rates. For example, the four quadrants can include (1) customized bit loading (e.g., bit loading satisfying a higher service level or a higher priority) with easy channel impairments (e.g., lower channel impairment), (2) customized bit loading with hard channel impairments (e.g., higher channel impairment), (3) standby (e.g., bit loading satisfying a lower service level or a lower priority) with easy channel impairments, and (4) standby with hard channel impairments. In some implementations, CMs in the two customized bit loading quadrants (e.g., quadrants (1) and (2)) can impact the bit loading results (e.g., bit loading profiles), while CMs in the two standby quadrants (e.g., quadrants (3) and (4)) can share the bit loading results if it is feasible (e.g., if the SNR margin level is greater than a threshold). In some implementations, the system can determine a service level or a priority or a target bit rate of a CM based on a customer profile. Examples of easy channel impairments can include subcarriers with a flat channel condition or substantially the same channel condition, or subcarriers in which a variation between a highest receiver modulation error ratio (RxMER) and a lowest RxMER is smaller than a threshold. In some implementations, a CM with an easy channel impairment can use a constant bit loading or a fixed bit loading pattern, such as assigning adjacent number of bits to even and odd-indexed subcarriers. Examples of hard channel impairments can include subcarriers with severely non-flat channel conditions, or subcarriers in which some subcarriers have an RxMER value that is a lot lower than other RxMER values. In some implementations, a CM with a hard channel impairment may not use a constant bit loading (e.g., a bit loading profile with the same bit loading across subcarriers), while a CM with an easy channel impairment can use a constant bit loading. In some implementations, a CM with a customized bit loading can have a high service level or a high priority (e.g., higher than other CMs) because their customers have paid for the high service level or the high priority. In some implementations, a CM may be assigned a lower service level or priority (e.g., lower than other CMs) due to customers with lower payment plans, even if the CM's channel condition allows it to achieve a higher net bit rate than the target bit rate required for its assigned service level or priority. These CMs are placed in standby subgroups. In some cases, a CM in a standby subgroup may be able to use a bit loading profile that provides a higher service level or priority than the one corresponding to its customers' payment plans.

In some implementations, the system can utilize a global metric representing loss based on receiver modulation error ratio (RxMER) values. The RxMER refers to a ratio between average signal power of a received signal and average noise power of the signal, or a ratio between power of the received signal to power of errors in the signal. An RxMER value can indicate how well a signal is being received such that higher RxMER values indicate better signal quality. In some implementations, the global metric can be a net bit rate per subcarrier of a CM (e.g., achievable average net bit rate per subcarrier). In some implementations, the system can customize bit loading based on the global metric to achieve target performance (e.g., a target bit rate or a target service level). In some implementations, the system can map between RxMER and bit loading through loss using a non-linear mapping, thereby achieving performance of "optimal" bit loading as much as possible using a shared set of bit loading profiles.

In some implementations, the system can use a target bit rate (or a target net bit rate). In some implementations, the system can determine target criteria (e.g., a target bit rate) for a group (e.g., a bucket or a subset) and add a CM to a group (which shares the same bit loading profile) until the group does not meet the target criteria (e.g., a target bit rate). For example, the system can determine a target net bit rate for a group and add a CM to a group until the net bit rate of the joint bit loading of the group (e.g., an average net bit rate of the joint bit loading profile for all the CMs in the group) is less than the target net bit rate. If the net bit rate of the joint bit loading of the group (e.g., a group with a target bit rate of 12) is less than the target net bit rate, the system can move some CMs to the next group (e.g., a group with a target bit rate of 11), so that the net bit rate of the joint bit loading for the remaining CMs is higher than or equal to the target net bit rate.

In some implementations, a QAM modulation defined in a constant bit loading list can start with the highest QAM modulation to a lower QAM modulations with an adjustment step of 1, for example. Example constant bit lists can include [12, 11] (bits), [12, 11, 10] (bits), [12, 11, 10, 9] (bits), etc. In some implementations, a constant bit loading list can be a subset of a customized bit loading list, or vice versa. For example, a constant bit loading list=[12] and customized bit loading list=[12, 11.5, 11, 10]; a constant bit loading list=[12, 11] and a customized bit loading list=[12, 11, 10.5, 8]; a constant bit loading list=[12, 11, 10, 8] and a customized bit loading list=[12, 11, 10].

In some implementations, the lowest target bit rate defines a minimum bit rate per subcarrier that the system can operate. The lowest target bit rate (or the minimum bit rate per subcarrier) can be mapped to the lowest QAM modulation specified in the customized bit loading list. CMs unable to achieve this minimum bit rate per subcarrier may be excluded from profile allocation and reported in a dropout CM list. For example, if a customized bit loading list=[12, 11, 10.5, 8], the system can determine customized bit loading profiles as follows: customized bit loading profile 0 such that 11<=average number of bits per subcarrier<12; customized bit loading profile 1 such that 10.5<=average number of bits per subcarrier<11; customized bit loading profile 2 such that 8<=average number of bits per subcarrier<10.5. In some implementations, CMs which have (achievable) average number of bits per subcarrier<8 can be excluded from profile allocation and be reported in the dropout list. In some implementations, the system or an operator can choose to reduce the target bits (or target bit rate) in a customized bit loading list to include the CMs in the profile allocation. Alternatively, a truck roll operation can be performed to address their poor channel conditions, rather than lowering the target bit rate for the last customized bit loading group.

In some implementations, a total number of elements in a constant bit loading list plus a total number of elements in a customized bit loading list-1 can be less than or equal to a total number of profiles. In some implementations, the system can program a target bit rate table which defines a target (or desired or preferred) bit rate per subcarrier for each CM, allowing the profile allocation algorithm to be customized to focus on achieving specified bit rate per subcarrier for the target CMs, and target bit rates (or desired bit rates) used in this table can map between elements in the customized bit loading list and a set of CMs. For example, 11 bits (in the customized bit loading list) can map to {CM0, CM3, CM4, CM5}, 10.5 bits can map to {CM1, CM2}, and 8 bits can map to {CM6, CM7}. In some implementations, the system can prioritize CMs with a higher capacity request (e.g., higher service level or higher priority) than CMs with lower capacity request. In some implementations, the system can start segmentation with the highest capacity (target bit rate) group first and attempt to pack as many CMs with the highest target bit rate into the group as possible, and the remaining CMs that cannot be assigned into the highest capacity group can be combined with CMs of the next highest capacity group to form a new group. In some implementations, those CMs assigned with a lower capacity than their desired bit rates can be reported as insights to a multiple system operator (MSO) highlighting customers with performance challenges. In some implementations, the system can provide expected output of profile allocation as follows: (1) constant bit loading profiles and customized bit loading profiles with list of CMs assigned to each group (e.g., subset or bucket); (2) CMs in the dropout list which are excluded in profile allocation operation; (3) CMs unassigned given current control parameters (e.g., constant bit loading list, customized bit loading list); and/or (4) CMs assigned to a customized bit loading group which has a data rate (e.g., average net bit rate) lower than their target rates (e.g., target bit rates or target net bit rates). In some implementations, an MSO can either increase the total number of profiles or lower the target bits (or target bit rates) in the customized bit loading list to handle the unassigned CMs. Alternatively, the MSO may schedule an on-site service operation to resolve the field issues causing poor performance for these CMs.

For example, with a constant bit loading list of and a customized bit loading list of [12, 11, 10.5, 8], for those CMs which cannot operate with 12 bits constant bit loading, the system can allocate a customized bit loading profile in the following priority order: (1) 11 bits easy group (or subset), (2) 10.5 bits easy group (or subset), (3) 8 bits easy group (or subset), (4) 11 bits hard group (or subset), (5) 10.5 bits hard group (or subset), and (6) 8 bits hard group (or subset).

In some implementations, the system can perform a four quadrants division, with the following configuration and/or parameters: (1) an achievable net bit rate (e.g., an average net bit rate) for each CM (e.g., among 7 CMs including CM0, CM1, CM2, CM3, CM4, CM5, CM6) as specified in a customized bit loading table is listed as follows: CM0: 11.7, CM1: 11.2, CM2: 7.5, CM3: 11.5, CM4: 11.6, CM5:

11.2, and CM6: 11; (2) a target bit rate for each CM as follows: CM0: 11, CM1: 10.5, CM2: 10.5, CM3: 11, CM4: 11, CM5: 11, CM6: 8; (3) CM0, CM1, CM3 and CM4 have Additive white Gaussian noise (AWGN) with a mild tilt; and (4) each of CM 5 and CM6 has a bigger ripple impairment.

In some implementations, in performing customized group bit loading with a target bit rate of 11 bits, CM0, CM1, CM3, CM4, CM5 and CM6 are chosen as candidates for this group because they all have achievable net bit rate higher or equal to the target bit rate of 11 bits. In addition, CM0, CM3, CM4, CM5 have a target bit rate of 11 bits, CM1 and CM2 have a target bit rate of 10.5 bits, CM5 and CM6 has more severe channel impairments than CM0, CM1, CM3 and CM4, and therefore, the system can assign CM0, CM3, CM4 to the customized bit loading with easy channel impairment quadrant. The system can assign CM 5 to the customized bit loading with hard channel impairment quadrant. The system can assign CM1 to the standby with easy channel impairment quadrant and CM6 to the standby with hard channel impairment quadrant. Assuming the lowest target bit rate in the customized bit rate list is 9, the system can exclude CM2 with achievable net bit rate per subcarrier<9 from profile allocation.

In some implementations, in performing the customized group bit loading for the easy group, the system can only take CM0, CM3 and CM4's RxMER vectors into account. Because CM1 is in a standby mode, CM1 may not impact the customized bit loading process for the 11 bits group. The system can only evaluate an SNR margin of CM1 given the customized bit loading for CM0, CM3 and CM4. If the SNR margin is higher than a target threshold, the system can assign CM1 to use the same bit loading profile as CM0, CM3 and CM4; otherwise, CM1 can be moved to the next group with a target bit rate of 10.5 bits, in which CM1 can be assigned to the customized bit loading with easy channel impairment quadrant, and then can be taken into account in the group bit loading there.

In some implementations, a system (e.g., a server 120, 320) can perform a first process for determining bit loading profiles for a plurality of CMs as follows. The system can define the highest constant bit loading rate for each CM as the maximum number of bits corresponding to the highest QAM modulation that the CM can use at a given target SNR margin. At (process) step 1-1, the system can assign the following CMs to a constant bit loading group: CMs having (1) an (achievable) average bit rate per subcarrier such that the average bit rate-a highest constant bit loading rate<a programmable threshold (default value is 1); and (2) a highest constant bit loading rate that belongs to the constant bit loading list. The system can determine those CMs left unassigned during this step 1-1 as candidate CMs for customized bit loading.

In some implementations, a target total number of profiles can be equal to N (N is an integer greater than 1), and a total number of constant bit loading profiles can be equal to M (M is an integer), then the total number of customized bit loading profiles can be equals to N-M. At step 1-2, the system can first cluster (or divide or classify) those unassigned CMs into Ne number of different candidate clusters (or candidate sets) based on respective values of (achievable) average bit per subcarrier of the unsigned CMs. The achievable average bit per subcarrier of single CM refers to an average bit per subcarrier for a customized bit loading profile for the single CM.

For example, assuming that 12 bits is the highest QAM modulation used in a system, given the customized bit loading list=[12, 11, 10.5, 8], the system can generate three clusters of CM, such that (1) CMs with an achievable net bit rate per subcarrier>=11 belong to cluster 1; (2) CMs with 10.5<=an achievable net bit rate per subcarrier<11 belong to cluster 2; (3) CMs with 8<=an achievable net bit rate per subcarrier<10.5 belong to cluster 3. In some implementations, the system can exclude CMs with achievable net bit rate per subcarrier<8 from profile allocation and report and/or include the CMs in a dropout CM list as an insight to the MSO. In some implementations, at step 1-3, the system can set a variable i to indicate cluster i.

At step 1-4, for non-empty cluster i, the system can divide (or cluster or classify) CMs in the cluster i into four subgroups (or subsets) including (1) customized easy (channel impairment) subgroup, (2) standby easy (channel impairment) subgroup, (3) customized hard (channel impairment) subgroup, and/or (4) standby hard (channel impairment) subgroup. In some implementations, the system can combine left-over (or unassigned) CMs in the customized easy subgroup and standby easy subgroup of the previous cluster (cluster (i−1)) with the customized easy subgroup of the current cluster (cluster i). In some implementations, the system can combine left-over (or unassigned) CMs in the customized hard subgroup and the standby hard subgroup of the previous cluster (cluster (i−1)) with the customized hard subgroup of the current cluster (cluster i).

In some implementations, in each non-empty cluster (or set), the system can further divide CMs in the cluster into an easy subgroup (or easy subset) and a hard subgroup (or hard subset) base on two possible approaches (as described below), and then apply the target (or desired) rate table to generate a standby group in which those CMs do not impact the customized bit loading profile. The first approach can calculate, for each CM, a value (an achievable average bit per subcarrier-a highest constant bit loading rate), and if the value is less than a programmable bit rate threshold, the CM can belong to the easy subgroup. If the value is greater than or equal to the programmable bit rate threshold, the CM can belong to the hard subgroup. The second approach can draw or use a plot with x axis as achievable net bit rate per subcarrier, and y axis as average RxMER for a given CM. Those CMs whose achievable net bit rate per subcarrier and average RxMER value gathers around a linear line can belong to the easy subgroup and others CMs can belong to the hard subgroup. In some implementations, the system can use a linear relationship (or a linear line) for AWGN channel as the ideal reference, and measure the distance from the linear line to the given CM. If the distance is above (or greater than) a given deviation threshold, the system can determine that this CM belongs to the hard subgroup. In some implementations, the system can examine both easy and hard subgroups, and gather together those CMs who has a target (desired) rate (e.g., 10.5) lower than a target customized bit loading rate for the cluster (e.g., 11) and put the CMs into a standby easy subgroup and/or a standby hard subgroup.

In some implementations, the system can first produce customized bit loading for each easy subgroup in the candidate clusters, while in some implementations, the system can generate customized bit loading for the easy subgroup of cluster 1 first.

At step 1-5, in some implementations, the system can divide the non-empty easy subgroup into a customized bit loading group for cluster i and an undecided easy subgroup. In some implementations, the system can evaluate the achievable average net bit rate of the joint bit loading for those CMs in the easy subgroup. In response to determining that the achievable average net bit rate of the joint bit loading is above or equal to a target customized bit loading rate, then the CMs can form the customized bit loading group 1, and the undecided easy subgroup can be null. However, in response to determining that the achievable average net bit rate of the joint bit loading is below the target customized bit loading rate, then the system can decide what are the CMs that need to be removed from the easy subgroup so that the final achievable average net bit rate of the remaining CMs is above or equal to the target customized bit loading rate. In some implementations, for each CM in the easy subgroup, the system can test or calculate a new achievable group bit rate (e.g., an average bit rate per subcarrier for the joint bit loading of the remaining CMs) if the CM is removed from the subgroup. In some implementations, the system can relocate whichever CM that produces the highest new achievable group bit rate, to an undecided easy subgroup, and continue the process until the joint bit loading with remaining CMs can generate an achievable group bit rate higher than the target customized bit loading rate. At the end of step 1-5, the easy subgroup can be divided into customized bit loading group 1 and the undecided easy subgroup.

At step 1-6, in some implementations, the system can determine that there are CMs left in the undecided easy subgroup, and N−M−L>1, where L denotes the total number of non-empty clusters, which means that there are additional customized bit loading profile that can be used for this undecided easy subgroup. The system can perform step 1-5 again with the undecided easy subgroup as the candidate. At the end of step 1-6, the system can generate $C_i$ customized bit loading groups ($C_i$ is an integer greater than or equal to 1) from CMs belonging to the non-empty initial easy subgroup of cluster i.

At step 1-7, for those CMs belong to the standby easy subgroup, the system can evaluate the SNR margin of each CM in the standby easy subgroup given the bit loading of the $C_i$ customized bit loading groups, and assign each CM belonging to the standby easy subgroup to the group (among the $C_i$ customized bit loading groups) with the highest net bit rate and the SNR margin above an SNR margin threshold.

At step 1-8, for each CM in the customized hard subgroup and standby hard group, the system can evaluate the SNR margin of each CM in the customized hard subgroup and standby hard group given the bit loading of the $C_i$ customized bit loading groups, and assign CMs belonging to the customized hard subgroup and standby hard group to the group (among the $C_i$ customized bit loading groups) with the highest net bit rate and the SNR margin above the SNR margin threshold.

At step 1-9, the system can compare the current value of i with the total number of clusters $N_c$. In response to determining that i is equal to Ne, the system can proceed to step 1-11, otherwise, the system can proceed to step 1-10. At step 1-10, the system can increase the variable i by 1 indicating the next cluster and proceed to step 1-4.

At step 1-4, the system can combine the left over CMs in the customized easy subgroup and standby easy subgroup of the previous cluster (e.g., cluster 1) with the customized easy subgroup of the current cluster (e.g., cluster 2), and repeat step 1-4 to 1-8 to generate customized bit loading groups for the current cluster. In step 1-6, if the variable i equals 2 (indicating that cluster 2 is being processed), in evaluating whether there is additional customized bit loading profile to use, the system can determine or confirm that a value of (N−M−C1−C2−(L−2)) is greater than 1, where L−2 means there are at least 1 profile left for each of the remaining non-empty clusters. In some implementations, the system can repeat the process (e.g., steps 1-4 to 1-10) to finish group segmentation with corresponding joint bit loading for the easy subgroup of all clusters.

At step 1-11, the system can compare the total number of customized bit loading profiles that are used (or assigned) with the total number of available customized bit loading profiles to determine whether there is still any bit loading profile available.

At step 1-12, in response to determining that there are one or more bit loading profiles available, the system can determine whether there are unassigned CM in customized hard subgroup for each cluster. In response to determining that there are unassigned CM in customized hard subgroup, the system can perform group segmentation for those CMs. In some implementations, the system can perform the group segmentation to generate a new customized bit loading group using one method of (1) an add-up method or (2) a subtract method.

In some implementations, the add-up method can start with the customized hard group of the cluster having the highest achievable net bit rate, and pick (or select or choose or determine) from the cluster, a CM with the highest net bit rate gain. A net bit rate gain is defined as a value of (an achievable net bit rate-a constant bit rate). For example, if customized bit rate list of [12, 11, 10, 8], and CM1=11.5, CM2=11.7, CM5=11.2, the cable modems (CM1, CM2, CM5) are in the hard group of bit rate=11, and the net bit rate gains for CM1, CM2 and CM5 are 0.5 (=11.5-11), 0.7 (=11.7-11) and 0.2 (=11.2-11), respectively. The system can use the RxMER values of the CM with the highest net bit rate gain as a seed vector, compute the joint bit loading of the CM with each other CM in the group, and pick (or select or choose or determine) the other CM which produces the highest net bit rate for the joint bit loading profile to join this seed CM to form the pair. The system can repeat this process to add other CMs to the new customized bit loading group if the outcome net bit rate of the joint bit loading profile is higher or equal to the target net bit rate for the cluster.

In some implementations, the subtract method can start with the customized hard group of the cluster with the highest net bit rate. In response to determining that the net bit rate of the joint bit loading profile of the customized hard group is higher than or equal to the target net bit rate of the cluster, the system can form a new customized bit loading group. Otherwise, In response to determining that the net bit rate of the joint bit loading profile of the customized hard group is lower than the target net bit rate of the cluster, the system can attempt to remove one CM from the customized hard group which can improve the net bit rate of the joint bit loading profile of the remaining CMs the most, and continue this process until the outcome net bit rate is higher than or equal to the target net bit rate for the cluster.

In some implementations, in response to determining that (1) there are still unassigned CM in the hard group, and (2) there is available bit loading profile, the system can continue this process (step 1-12). Assuming $D_i$ customized bit loading profiles are generated (from cluster i) in this process, for each CM in the standby hard group (of cluster i), the system can evaluate an SNR margin of the CM given the $D_i$ customized bit loading profiles, the system can assign the CM to the group with the highest net bit rate and the SNR margin above the SNR margin threshold.

In response to determining that there is no additional bit loading profile available (in step 1-11), the system can proceed to step 1-15 to stop the iteration, and for each left unassigned CM in the group segmentation process, the system can evaluate its SNR margin given all the customized bit loading profiles, assign the CM to the group with the highest net bit rate and the SNR margin above the SNR margin threshold. In response to determining that this group net bit rate is lower than this CM's target bit rate, the system can report it as an insight to MSO identifying customers with performance deficiencies. For all the remaining unassigned CMs, the system can report them as left over CMs in the group bit loading process. The MSO can either reduce the target bit rate or increase the total number of profiles to adjust the group bit loading outcome for better coverage. Alternatively, MSO can schedule on-site service operation to resolve the field issues causing poor performance for these CM. Otherwise, in response to determining that there is available bit loading profile and no unassigned CM in the customized hard group of current cluster, the system can move unassigned CM in the standby hard group of current cluster to the customized hard group of next cluster and continue this process (step 1-12). The system can finish or complete this iteration until there is no unassigned CM in customized hard group. It is noted that in the last cluster, there is no standby group, because the lowest target bit rate of CM is equal to the lowest customized bit rate in the last cluster.

At step 1-13, the system computes the total number of bit loading profiles used by customized easy group and customized hard group for all the clusters, which is defined as $$\sum_{i=1}^{Nc}(Ci+Di),$$

and compare it with the total number of available customized bit loading profiles N-M. if $$\sum_{i=1}^{Nc}(Ci+Di)<N-M,$$

it means there are one or more additional customized bit loading profile to use, the system continues to step 1-14, otherwise, it proceeds to step 1-15 to complete the process. For example, if $N_c=4$, the inequality can be (C1+C2+C3+C4+D1+D2+D3+D4)<N-M.

At step 1-14, the system can split a customized bit loading group into two to improve the total capacity. In some implementations, for each customized bit loading group, the system can compute the total bit rate (=sum of the achievable net bit rate for each CM in the group) achievable by the CMs if customized bit loading profile is used for each CM, and subtract the total group bit rate (=bit rate of the joint bit loading profile for the group*number of CMs). The total bit rate achievable is the sum of the achievable bit rate of each CM if a customized bit loading profile is used for each of them, this rate is higher or equal to the total group bit rate, because if all CM have to use one common profile, they may sacrifice bit rate. Therefore, the total achievable bit rate computed from a result of the algorithms described in U.S. patent application Ser. No. 19/040,275 can be higher than the total group bit rate which use the joint bit loading algorithm according to embodiments of the present disclosure.

The output of the subtraction can be the measurement of the potential loss for this group by utilizing a single common bit loading profile. The system can normalize the loss by the size of the group and pick the group with the highest normalized loss as the candidate group for splitting.

In some implementations, the system can pick the CM which has the highest loss in the group as a seed CM, and attempt to pair the seed CM with other CMs in the group, then choose the other CM which produces the highest net bit rate for the joint bit loading profile to join this seed CM to form the pair if the outcome net bit rate is higher than the initial group net bit rate. The system can repeat this process to add other CMs to the new customized bit loading group if the total bit rate is increasing for the two new split groups. After completing the bit loading group split, the system can increase the corresponding counter Ci or Di for the associated cluster, and then proceed to step 1-13 to check for availability of additional bit loading profile.

At step 1-15, the system may complete the group segmentation process and outputs each constant bit loading profile and customized bit loading profile together with the list of CMs assigned to each profile. If there are dropout CMs, unsigned CMs or assigned CMs with a bit loading profile lower than its target bit rate, the system may report them to MSO as insight for further performance improvement.

In summary, the system can perform this group segmentation algorithm as an iterative process to assign CMs to customized bit loading group with the following priority: (1) higher target bit rate (customized) easy group>lower target bit rate (standby) easy group>higher target bit rate (customized) hard group>lower target bit rate (standby) hard group, and the system can attempt to assign as many CMs to each group as possible if the outcome group bit rate is higher than the target bit rate. In some implementations, after all CMs are assigned to the groups, the remaining bit loading profiles can be leveraged to split some of those groups to achieve higher capacity.

In some implementations, the system may choose to simplify the group segmentation process without differentiating the easy and hard channel conditions and use only two subgroups in each cluster: (1) customized bit loading group, (2) standby group. In such simplified implementations, the system may perform the same iterative process as defined earlier for easy customized bit loading group and easy standby group (e.g., steps 1-4 to 1-10) to achieve group segmentation for the customized bit loading group and standby group of all clusters. If there are one or more additional bit loading profiles to use after the group segmentation of all the clusters, the system can split a customized bit loading group into two to improve the total capacity iteratively (e.g., step 1-13 and 1-14) until all available customized bit loading profiles (e.g., N-M) are used.

In some implementations, the system can perform a unified method of profile management allocation. The unified profile allocation method can include (1) segmenting (or grouping) CMs based on similar channel capacity and characteristics, (2) proposing a bit loading profile that fits each group, (3) identifying a next bit loading profile for each CM and/or each channel when the CM's performance improves or degrades, and/or (4) reporting the expected SNR margin for each CM and/or each channel and profile pair. Profile 0 can be set as the default profile, and bit rates of the set of profiles can be such that Profile 15>Profile 14>Profile 13> . . . >Profile 1>Profile 0. Each CM can have three additional assigned profiles including an active profile in use, and two profiles to switch to when performance of the CM improves or degrades. The system can report and/or monitor the SNR margin value for each CM and/or each channel to profile pair, since different CM/channel in the same group could have different SNR margin given the same assigned bit loading profile.

In some implementations, the system can perform a non-unified method of profile management allocation. In some implementations, the system may have more accurate measurement or knowledge of the loss target value (denoted by "Loss_Target") of some cable modem model types than for others. The value, and the accuracy or knowledge of a CM's "Loss_Target" can also depend on the modulator model type which is generating the OFDM signal transmitted to the CM. CMs may be assigned (or divided) into groups based on the accuracy or knowledge of their "Loss_Target". A plurality of groups of CMs may exist in a system in some implementations, and without limitation, for purposes of explanation, assuming the situation of two different groups of CMs in regard to the accuracy or knowledge of their "Loss_Target," with one group being labeled MoreAccurate and one group being labeled LessAccurate. The non-unified profile allocation method can include (1) segmenting MoreAccurate based CMs and LessAccurate based CMs separately based on their channel capacity and characteristics, (2) proposing a bit loading table fit each group, (3) identifying a next bit loading profile for each CM and/or each channel when the CM's performance improves or degrades, and/or (4) reporting the expected SNR margin for each CM and/or each channel and profile pair. Bit rates of the set of profiles can be such that Profile 15> Profile 13> . . . >Profile 1, and Profile 14>Profile 12> . . . >Profile 2. Profile 0 can be reserved as default profile, and Profile 1, 3, . . . 15 can be used for MoreAccurate based CMs and Profile 2, 4, . . . , 14 can be used for LessAccurate based CMs.

In some implementations, a system (e.g., a CMTS or a server) can include a joint bit loading synthesizer. The joint bit loading synthesizer can be implemented in hardware (e.g., circuitry or processor), firmware, software, or a combination thereof. The joint bit loading synthesizer can receive, as input data, demodulation data (e.g., pre-processed demodulation data such as RxMER values) and/or a bit loading profile (e.g., current bit loading profile) relating to a group of cable modems, perform a synthesis of bit loading for the group of CMs, and output a new joint bit loading profile for the cable modem group.

In some implementations, a CMTS is limited such that the CMTS can provide one bit loading for each segment of P consecutively enumerated data subcarriers. And for the last segment of a OFDM channel, it may contain less than P data subcarriers. In some embodiment, a synthesized group bit loading profile can be optimized with this constraint applying, such that each segment of subcarriers can be constrained to have the same bit loading value. The group bit loading optimization algorithm is configured to synthesize the bit loading for each segment, and the same bit loading is used for all the data subcarriers in each segment. When the size of the segment is equal to 1, the optimization algorithm is synthesizing the group bit loading profile on each subcarrier.

In some implementations, given the segment size P, the system can divide all the data subcarriers (e.g., total Q data subcarriers) of a OFDM channel of a CM into M segments, where consecutively enumerated data subcarriers are assigned to each segment, and the first M−1 data segments are of size P, while the last data segment may have elements less than P, if Q is not dividable by P.

For $m^{th}$ segment of total M segments in an OFDM channel of CM k ($1 \le m \le M\_seg$; $1 \le k \le K$, m, M_seg, k, K are integers, M_seg is the total number of segments, and K is the total number of CMs in the group), $BL_{k,m}$ denotes the constellation size or bit loading on the $m^{th}$ segment of CM k, $ND_{k,m}$ denotes the number of data subcarriers in the $m^{th}$ segment of CM k. Total $BL_k$ denotes the total bit loading of the OFDM channel for CM k, it equals the sum of the product of $BL_{k,m}$ and $NC_{k,m}$ over all segments.

In some implementations, a RxMER vector can include a plurality of RxMER values $RxMER_{k,n}$ corresponding to a plurality of subcarriers of a channel for CM k ($1 \le n \le Ns$, n, Ns are integers, Ns is the total number of subcarriers in an OFDM channel). In some implementations, each of the constellation sizes $BL_{k,m}$ for CM k can include, for example, 0, 4, 6, 7, 8, 9, 10, 11, and 12 (bits). In some implementations, the system can include a loss table (e.g., in a memory). The loss table is a comprehensive loss table which shows or includes a loss value for each possible data subcarrier constellation size (e.g., 0, 4, 6, 7, 8, 9, 10, 11, 12) and for a fine grid of RxMER values (such as stepping 0.05 dB, just as an example).

In some implementations, given a constellation size $BL_{k,m}$, for each data subcarrier belongs to segment m, the system can pick corresponding RxMER value from the RxMER vector and obtain a loss value by looking up the loss table using the constellation size and RxMER value. $LV_{k,m}$ is set to the average of all these loss values of data subcarriers in $m^{th}$ segment of CM k. Here, the "loss" value or "loss" for each data subcarrier refers to a symbol error rate (SER) or bit error rate (BER) for a QAM constellation at a given SNR (or RxMER), an expected value of SER or BER for a QAM constellation at a given SNR (or RxMER), or any error metric for the QAM constellation at the given SNR. The "loss" values synthesized for use in the SNR Margin Estimation invention, and in use in this invention, are developed to match the FEC coding, modulation and demodulation, and FEC decoding capabilities. In some implementations, the loss value or loss can be a function of a constellation size and an RxMER value.

In some implementations, the system can identify, obtain, or determine a loss target value (denoted by "Loss_Target") for a cable modem model type of cable modem. In some implementations, Loss_Target can be a loss value which is dependent on a model type of the cable modem. In some implementations, the system can learn Loss_Target for cable modems operating in a plant (e.g., cable networks) with test profiles operating in a channel, as provided in DOCSIS specifications for OFDM. For example, when the error statistics corresponding to a cable modem are made available to the server and/or an aggressive test profile (forcing operation of the cable modem to near FEC threshold) is provided, the system can obtain, identify, learn, or calculate Loss_Target for the cable modem using the error statistics and/or the aggressive test profile. For generality of implementation, $Loss\_Target_k$ denotes the Loss_Target for CM k, which enable the system to apply different Loss_Target for different CMs, so that it could account for the potential performance difference of different CM devices.

In some implementations, a complement value of a subcarrier can indicate a probability that QAM bits of the subcarrier (according to the constellation size of the subcarrier) are received correctly. For example, a complement value CV for a single QAM bit can be one minus the corresponding loss value (e.g., BER).

In some implementations, given a constellation size $BL_{k,m}$ for segment m of CM k, a complementary value of the averaged loss value $LV_{k,m}$ for segment m of CM k can be defined as follows:

$$\text{Complement value } (CV_{k,m}) = \text{constellation size } (BL_{k,m}) - \text{loss value } (LV_{k,m}) \quad \text{(Equation 1)}$$

Each data segment (mth segment) of CM k can compute $LV_{k,m}$ and $CV_{k,m}$, depending on the RxMER values of those data subcarriers belongs to $m^{th}$ segment of CM k and its constellation size $BL_{k,m}$. $Total\_Loss_k$ denotes the total loss value of the OFDM channel for CM k, which is the sum of the product of $LV_{k,m}$ and ND km over all M segments, where $ND_{k,m}$ denotes the number of data subcarriers in the $m^{th}$ segment of CM k.

$$\text{Total\_Loss}_k = \sum_{m=1}^{M} LV_{k,m} \times ND_{k,m} \quad \text{(Equation 2)}$$

$Total\_Complement_k$ denotes the total complement value of the OFDM channel for CM k, which is the sum of $CV_{k,m}$ over all m.

$$\text{Total\_Complement}_k = \sum_{m=1}^{M} CV_{k,m} \times ND_{k,m} \quad \text{(Equation 3)}$$

In some implementations, a complementary value of $Loss\_Target_k$ (referred to as "complement target value" denoted by "$Complement\_Target_k$") for CM k can be defined as follows:

$$\text{Complement\_Target}_k = 1 - \text{Loss\_Target}_k \quad \text{(Equation 4)}$$

where each of $Loss\_Target_k$ and $Complement\_Target_k$ can have a value between 0 and 1. For example, Loss_Target is 0.015 and $Complement\_Target_k$ is 0.985.

In some implementations, the system can assign a loss value $LV_{k,m}$ and/or a complement value $CV_{k,m}$ for each data segment of CM k depending on (1) that segment's bit loading profile (e.g., constellation size or density $BL_{k,m}$) and/or (2) RxMER values of those data subcarriers belong to $m^{th}$ segment. In some implementations, the system can assign a loss value and/or a complement value for each data subcarrier in segment m of CM k using the loss table. $LV_{k,m}/CV_{k,m}$ is set to the average of all these loss/complement values.

For mth segment of M segments in an OFDM channel for CM k (1≤m≤M_seg; m, M are integers), $BL\_add_{k,m,q}$ denotes the new bit loading after increase the bit loading $BL_{k,m}$ by q levels, and $CV\_add_{k,m,q}$ denotes a complement value when the mth segment of CM k has an increase in its bit loading by q levels (e.g., from 0 bit to 4 bits, 4 bits to 6 bits and 6 bits to 7 bits are all considered as increasing by 1 level given the bit loading set equal to [0, 4, 6, 7, 8, 9, 10, 11, 12] bits). $CV\_delta\_add_{k,m,q}$ denotes an normalized differential increase in the complement value of CM k when the mth segment has an increase in its bit loading $BL_{k,m}$ from q−1th level to the qth level, it can be computed as follows:

$$\text{CV\_delta\_add}_{k,m,q} = (\text{CV\_add}_{k,m,q} - \text{CV\_add}_{k,m,q-1}) / (\text{BL\_add}_{k,m,q} - \text{BL\_add}_{k,m,q-1}) \quad \text{(Equation 5)}$$

$BL\_add_{k,m,q}$−$BL\_add_{k,m,q}$−1 equals the number of bits increase between the two adjacent QAM modulation levels. For example, assume $BL_{k,m}$=4, then $BL\_add_{k,m,1}$=6, $BL\_add_{k,m,2}$=7, and $BL\_add_{k,m,2}$−$BL\_add_{k,m,1}$=1.

Similarly, For mth segment of M subcarriers in an OFDM channel for CM k (1≤m≤M_seg; m, M_seg are integers), $BL\_sub_{k,m,q}$ denotes the new bit loading after decrease the bit loading $BL_{k,m}$ by q levels, and $CV\_sub_{k,m,q}$ denotes a complement value when the mth segment of CM k has a decrease in its bit loading by q levels (e.g., when the constellation size becomes $BL\_sub_{k,m,q}$). $CV\_delta\_sub_{k,m,q}$ denotes a normalized differential decrease in the complement value of the mth segment for CM k when the mth segment has a decrease in its bit loading from q−1th levels to q levels (e.g., when the constellation size becomes $BL\_sub_{k,m,q}$), it can be computed as follows:

$$\text{CV\_delta\_sub}_{k,m,q} = (\text{CV\_sub}_{m,k,q} - CV_{m,k,q-1}) / (\text{BL\_sub}_{k,m,q} - \text{BL\_sub}_{k,m,q-1}) \quad \text{(Equation 6)}$$

$BL\_sub_{k,m,q}$-$BL\_sub_{k,m,q}$-1 equals the number of bits decrease between the two adjacent QAM modulation levels. For example, assume $BL_{k,m}$=7, then $BL\_sub_{k,m,1}$=6, $BL\_sub_{k,m,2}$=4, and $BL\_sub_{k,m,2}$−$BL\_sub_{k,m,1}$=−2.

When $q = 0$, $\text{CV\_add}_{k,m,0} = CV_{k,m}$ and $\text{CV\_sub}_{k,m,0} = CV_{k,m}$.

In some implementations, a system (e.g. CMTS or a server) can perform an iterative optimization process to synthesize the joint bit loading profile (or group bit loading profile) for high net bit rate of a group of cable modems. In some implementations, an iterative algorithm is applied to synthesize the joint bit loading profile for a list of RxMER vectors coming from the given CM group. In some implementation, the system can receive input data for Ns subcarriers in an OFDM channel from K CMs in the group (1≤Ns; 1≤K, Ns, K are integers). In some implementation, the input data can include an list of RxMER vectors (e.g., $RxMER_{k,n}$ where k is the CM index and n is the subcarrier index, 1≤n≤Ns; 1≤k≤K), a plurality of Complement_Target for the group of CMs (e.g., $Complement\_Target_k$ for CM k), and a plurality of the constellation sizes for CMs, which provides information regarding the location of the continuous pilots, physical layer link channel (PLC), excluded subcarriers, data subcarriers, etc. The group bit loading profile defines the bit loading on those data subcarriers. In some implementations, the input data can include a plurality of Loss_Target for the group of CMs (e.g., $Loss\_Target_k$ for CM k), and the system can calculate $Complement\_Target_k$ using Equation 4.

The iterative optimization process described herein can be implemented in four versions, each with a distinct approach to achieving the desired result. In all versions, the process starts with an initial group bit loading profile, and then iteratively adjusts the bit loading on subcarriers to optimize the joint bit loading profile for achieving a higher net bit rate across a group of CMs. The following describes four distinct version of the iterative optimization process.

In some implementations, the system can execute the first version of the iterative group bit loading profile optimization process using Complement_Value of each CM as the optimization criteria. At step 2-1, the system takes input data includes: an list of RxMER vectors (e.g., $RxMER_{k,n}$, where k is the CM index and n is the subcarrier index, 1≤n≤Ns; 1≤k≤K), a plurality of Complement_Target for the group of CMs (e.g., Complement_Target for CM k), and a plurality of the constellation sizes for CMs, which provides information regarding the location of the continuous pilots, physical layer link channel (PLC), excluded subcarriers, data subcarriers, etc.

In some implementations, at step 2-2, the system generates an initial group bit loading profile through the following steps and then based on it, compute a plurality of internal metrics needed for the optimization process.

In some implementations, $CV\_per\_bit_{k,m}$ denotes an averaged complement value per bit for mth segment of CM k with a bit loading $BL_{k,m}$, and RxMER vector (e.g., $RxMER\_Vec_{k,m}$) corresponding to the data subcarriers in mth segment. The system can calculate $CV\_per\_bit_{k,m}$ as following, and for a given $RxMER\_Vec_{k,m}$, $CV\_per\_bit_{k,m}$ decreases as $BL_{k,m}$ increases.

$$CV\_per\_bit_{k,m} = \frac{CV_{k,m}}{BL_{k,m}} \quad \text{(Equation 7)}$$

In some implementation, the system can generate an initial bit loading $BL_{k,m}$ by assigning a maximum constellation size that maintains $CV\_per\_bit_{k,m}$ to be greater or equal to $Complement\_Target_k$, which means with the initial bit loading $BL_{k,m}$, increase the bit loading of any segment by 1 level can cause that segment's $CV\_per\_bit_{k,m}$ to be less than $Complement\_Target_k$.

In some implementation, the system can generate the initial group bit loading $BLG_m$ for mth segment by taking the minimum value of $BL_{k,m}$, which means with the initial bit loading $BLG_m$, the complement value per bit for the initial bit loading is higher or equal to the $Complement\_Target_k$ of all the CMs in the group.

In some implementation, the system can set $BL_{k,m}=BLG_m$, and then compute $Total\_Complement_k$ using Equation 3 for each CM.

In some implementation, the system can compute $CV\_delta\_add_{k,m,q}$, the normalized differential increase in the averaged complement value of CM k when the mth segment has an increase in its bit loading $BLG_m$ from q−1th level to the qth level using Equation 5. For example, given the bit loading set equal to [0, 4, 6, 7, 8, 9, 10, 11, 12] bits, and $BLG_m=4$, the system can compute $CV\_delta\_add_{k,m,1}$, $CV\_delta\_add_{k,m,2}$, $CV\_delta\_add_{k,m,3}$, $CV\_delta\_add_{k,m,4}$, $CV\_delta\_add_{k,m,5}$ $CV\_delta\_add_{k,m,6}$, $CV\_delta\_add_{k,m,7}$ for bit loading increase of 1 level (e.g., 6 bits), 2 levels (e.g., 7 bits), 3 levels (e.g., 8 bits), 4 levels (e.g., 9 bits), 5 levels (e.g., 10 bits), 6 levels (e.g., 11 bits), 7 levels (e.g., 12 bits).

In some implementations, the system can compute Total_Bits of the initial group bit loading as follows:

$$Total\_Bits = \sum_{m=1}^{M} BLG_m \times ND_{k,m} \quad \text{(Equation 8)}$$

In some implementations, $delta\_complement\_target_k$ denotes the difference between $Total\_Complement_k$ and the product of $Complement\_Target_k$ and Total_Bits. The system can compute the initial value for it as follows:

$$delta\_complement\_target_k = Total\_Complement_k - Complement\_Target_k \times Total\_Bits \quad \text{(Equation 9)}$$

In some implementations, $delta\_complement\_target\_update_{k,m}$ denotes the updated $delta\_complement\_target_k$ for CMk, if the system increase the group bit loading $BLG_m$ at mth segment from $BL\_add_{k,m,q-1}$ bits to $BL\_add_{k,m,q}$ bits. At step 2-3, the system can compute $delta\_complement\_target\_update_{k,m}$ for 1≤m≤M_seg, 1≤k≤K as follows:

$$delta\_complement\_target\_update_{k,m} = delta\_complement\_target_k + (CV\_delta\_add_{k,m,q} - Complement\_Target_k) \times (BL\_add_{k,m,q} - BL\_add_{k,m,q-1}) \times ND_{k,m} \quad \text{(Equation 10)}$$

For those subcarriers which already use the highest QAM modulation in the group bit loading, no additional bit adjustment is needed, therefore, $delta\_complement\_target\_update_{k,m}$ is set to $delta\_complement\_target_k$ for them in step 2-3, and they are excluded from comparison in step 2-4 and 2-5.

In some implementations, at step 2-4, the system can compute the minimum value of $delta\_complement\_target\_update_{k,m}$ across all CMs at a given segment m as:

$$delta\_complement\_target\_update\_min_m = \min(delta\_complement\_target\_update_{k,m}) \text{ for } 1 \le k \le K \quad \text{(Equation 11)}$$

In some implementations, at step 2-5, the system can compute the maximum value of $delta\_complement\_target\_update\_min_m$ across all adjustable segments as:

$$delta\_complement\_target\_update\_max = \max(delta\_complement\_target\_update\_min_m) \text{ for } 1 \le m \le M\_seg \quad \text{(Equation 12)}$$

denotes the segment index where the maximum value is as m_max.

In some implementations, at step 2-6, the system can evaluate the following inequity:

$$delta\_complement\_target\_update\_max > 0 \quad \text{(Equation 13)}$$

In some implementations, if the inequity of Equation 13 is true, at step 2-7, the system can increase group bit loading $BLG_{m\_max}$ at subcarrier m_max by 1 level, set $delta\_complement\_target_k = delta\_complement\_target\_update_{k,m\_max}$, increase the q counter of $CV\_delta\_sub_{k,m\_max,q}$ and $BL\_sub_{k,m\_max,q}$ by 1, and then return to step 2-3 to continue the iterative process of increasing the group bit loading.

In some implementations, if the inequity of Equation 13 is false, at step 2-8, the system may compare delta_complement_target_update_max against 0, if it equals 0, the system can increase the group bit loading $BLG_{m\_max}$ at subcarrier m_max by 1 level and then end the iterative process. Otherwise, the system completes the iterative process directly without increasing the group bit loading.

In some implementations, a system (e.g., CMTS or a server) can perform a second version of the iterative optimization process to synthesize the joint bit loading profile for high net bit rate of a group of cable modems. The overall structure remains similar, but the approach to initialize the group bit loading profile is different, thus the adjustment step is different (e.g., decrease the bit loading by 1 level rather than increase the bit loading by 1 level). Both versions using Complement_Value as optimization criteria, however, the internal computation metrics are quite different due to the difference in the adjustment steps. The second version of the iterative optimization process is described as follows.

In some implementations, at step 3-1, the input data can include an list of RxMER vectors (e.g., $RxMER_{k,n}$, where k is the CM index and n is the subcarrier index, $1 \le n \le Ns$; $1 \le k \le K$), a plurality of Complement_Target for the group of CMs (e.g., $Complement\_Target_k$ for CM k), and a plurality of the constellation sizes for CMs, which provides information regarding the location of the continuous pilots, physical layer link channel (PLC), excluded subcarriers, data subcarriers, etc. The group bit loading profile defines the bit loading on those data subcarriers.

In some implementations, at step 3-2, the system generates an initial bit loading for the group through the following steps and then based on it, compute a plurality of internal metrics needed for the optimization process.

In some implementations, $CV\_per\_bit_{k,m}$ denotes an averaged complement value per bit for mth segment of CM k with a bit loading $BL_{k,m}$. and RxMER vector (e.g., $RxMER\_Vec_{k,m}$) corresponding to the data subcarriers in mth segment. The system can calculate $CV\_per\_bit_{k,m}$ using Equation 7. For a given $RxMER\_Vec_{k,m}$, $CV\_per\_bit_{k,m}$ decreases as $BL_{k,m}$ increases.

In some implementation, the system can generate an initial bit loading $BL_{k,m}$ by assigning a minimum constellation size that maintains $CV\_per\_bit_{k,m}$ to be less than $Complement\_Target_k$, which means with the initial bit loading $BL_{k,m}$, decrease the bit loading of any subcarrier by 1 level can cause that subcarrier's $CV\_per\_bit_{k,m}$ to be greater or equal to $Complement\_Target_k$.

In some implementation, the system can generate the initial group bit loading $BLG_m$ for $m^{th}$ segment by taking the maximum value of $BL_{k,m}$ across all the CMs, which means with the initial bit loading $BLG_m$, the complement value per bit for the initial bit loading is less than the Complement_Target for each CM in the group.

In some implementation, the system can set $BL_{k,m}=BLG_m$, and then compute $Total\_Complement_k$ using Equation 3 for each CM k.

In some implementation, the system can compute $CV\_delta\_sub_{k,m,q}$, the normalized differential increase in the averaged complement value of CM k when the $m^{th}$ segment decreases its bit loading $BLG_m$ from q−1th level to the qth level using Equation 6. The system can compute $CV\_delta\_sub_{k,m,q}$ up to the lowest QAM modulation. For example, given the bit loading set equal to [0, 4, 6, 7, 8, 9, 10, 11, 12] bits, and $BLG_m=7$, the system can compute $CV\_delta\_sub_{k,m,1}$, $CV\_delta\_sub_{k,m,2}$, $CV\_delta\_sub_{k,m,3}$ for bit loading decrease of 1 level (e.g., 6 bits), 2 levels (e.g., 4 bits), 3 levels (e.g., 0 bits).

In some implementations, the system can compute Total_Bits of the initial group bit loading using Equation 8.

In some implementations, $delta\_complement\_target_k$ denotes the difference between $Total\_Complement_k$ and the product of $Complement\_Target_k$ and Total_Bits. The system can compute the initial value for it using Equation 9.

In some implementations, $delta\_complement\_target\_update_{k,m}$ denotes the updated $delta\_complement\_target_k$ for CMk, if the system decrease the group bit loading $BLG_m$ at mth segment from $BL\_sub_{k,m,q-1}$ bits to $BL\_sub_{k,m,q}$ bits. At step 3-3, the system can compute $delta\_complement\_target\_update_{k,m}$ for $1 \le m \le M\_seg$, $1 \le k \le K$ as follows:

$$delta\_complement\_target\_update_{k,m} = delta\_complement\_target_{k+}(CV\_delta\_sub_{k,m,q} - Complement\_Target_k) \times BL\_sub_{k,m,q} - BL\_sub_{k,m,q-1}) \times ND_{k,m} \quad \text{(Equation 14)}$$

For those subcarriers which already use the lowest QAM modulation in the group bit loading, no additional bit adjustment is needed, therefore, $delta\_complement\_target\_update_{k,m}$ is set to $delta\_complement\_target_k$ for them in step 3-3, and they are excluded from comparison in step 3-4 and 3-5.

In some implementations, at step 3-4, the system can compute the minimum value of $delta\_complement\_target\_update_{k,m}$ across all CMs at a given segment m as defined in Equation 11.

In some implementations, at step 3-5, the system can compute the maximum value of $delta\_complement\_target\_update\_min_m$ across all adjustable segments as defined in Equation 12, and denotes the segment index where the maximum value is as m_max.

In some implementations, at step 3-6, the system can evaluate the following inequity:

$$delta\_complement\_target\_update\_max < 0 \quad \text{(Equation 15)}$$

In some implementations, if the inequity of Equation 15 is true, at step 3-7, the system can decrease group bit loading $BLG_{m\_max}$ at subcarrier m_max by 1 level, set $delta\_complement\_target_k$ $delta\_complement\_target\_update_{k,m\_max}$, increase the q counter for $CV\_delta\_sub_{k,m\_max,q}$ and $BL\_sub_{k,m\_max,q}$ by 1, then return to step 3-3 to continue the iterative process of decreasing the group bit loading.

In some implementations, if the inequity of Equation 15 is false, at step 3-8, the system can decrease the group bit loading $BLG_{m\_max}$ at subcarrier m_max by 1 level and then complete the iterative process.

In some implementations, a system (e.g., CMTS or a server) can perform a third version of the iterative optimization process to synthesize the joint bit loading profile for high net bit rate of a group of cable modems. The third version uses different optimization criteria (e.g., using Loss_Value rather than Complement_Value). This version computes Total_Loss value for each CM and compare against Loss_Target in the iteration process, therefore, the internal computed metrics are quite different from the first version and the second version. The third version of the iterative optimization process is described as follows.

In some implementations, at step 4-1, the system takes input data, which may include: an list of RxMER vectors (e.g., $RxMER_{k,n}$, where k is the CM index and n is the subcarrier index, $1 \le n \le Ns$; $1 \le k \le K$), a plurality of Loss_Target for the group of CMs (e.g., $Loss\_Target_k$ for CM k), and a plurality of the constellation sizes for CMs, which provides information regarding the location of the continuous pilots, physical layer link channel (PLC), excluded subcarriers, data subcarriers, etc.

In some implementations, at step 4-2, the system can generate an initial bit loading for the group through the following steps and then based on it, compute a plurality of internal metrics needed for the optimization process.

In some implementations, $LV\_per\_bit_{k,m}$ denotes a loss value per bit for mth segment of CM k with a bit loading $BL_{k,m}$, and RxMER Vector (e.g., $RxMER\_Vec_{k,m}$) corresponding to the data carriers in $m^{th}$ segment. The system can calculate $LV\_per\_bit_{k,m}$ as follows. For a given $RxMER\_Vec_{k,m}$, $LV\_per\_bit_{k,m}$ increases as $BL_{k,m}$ increases.

$$LV\_per\_bit_{k,m} = \frac{LV_{k,m}}{BL_{k,m}} \quad \text{(Equation 16)}$$

In some implementation, the system can generate an initial bit loading $BL_{k,m}$ by assigning a maximum constellation size that maintains $LV\_per\_bit_{k,m}$ to be less than $Loss\_Target_k$, which means with the initial bit loading $BL_{k,m}$, increase the bit loading of any subcarrier by 1 level can cause that subcarrier's $LV\_per\_bit_{k,m}$ to be greater or equal to $Loss\_Target_k$.

In some implementation, the system can generate the initial group bit loading $BLG_m$ for $m^{th}$ segment by taking the minimum value of $BL_{k,m}$ across all the CMs, which means with the initial bit loading $BLG_m$, the loss value per bit for the initial bit loading is greater than the $Loss\_Target_k$ for each CM in the group.

In some implementation, the system can set $BL_{k,m}=BLG_m$, and then compute $Total\_Loss_k$ using Equation 2 for each CM k.

In some implementation, $LV\_add_{k,m,q}$ denotes an averaged loss value when the mth segment of CM k has an increase in its bit loading by q levels (e.g., from 0 bit to 4 bits, 4 bits to 6 bits and 6 bits to 7 bits are all considered as increasing by 1 level given the bit loading set equal to [0, 4, 6, 7, 8, 9, 10, 11, 12] bits). $LV\_delta\_add_{k,m,q}$ denotes an normalized differential increase in the averaged loss value of segment m for CM k when the mth segment has an increase in its bit loading $BL_{k,m}$ from q−1th level to the qth level, it can be computed as follows:

$$LV\_delta\_add_{k,m,q} = (LV\_add_{k,m,q} - LV\_add_{k,m,q-1}) / (BL\_add_{k,m,q} - BL\_add_{k,m,q-1}) \quad \text{(Equation 17)}$$

$BL\_add_{k,m,q} - BL\_add_{k,m,q-1}$ equals the number of bits increase between the two adjacent QAM modulation levels. For example, assume $BL_{k,m}=4$, then $BL\_add_{k,m,1}=6$, $BL\_add_{k,m,2}=7$, and $BL\_add_{k,m,2}-BL\_add_{k,m,1}=1$. The system can compute $LV\_delta\_add_{k,m,q}$ up to the highest QAM modulation. For example, given the bit loading set equal to [0, 4, 6, 7, 8, 9, 10, 11, 12] bits, and $BLG_m=9$, the system can compute $LV\_delta\_add_{k,m,1}$, $LV\_delta\_add_{k,m,2}$, $LV\_delta\_add_{k,m,3}$ for bit loading increase of 1 level (e.g., 10 bits), 2 levels (e.g., 11 bits), 3 levels (e.g., 12 bits). When q=0, $LV\_add_{k,m,0}=LV_{k,m}$.

In some implementations, the system can compute Total_Bits of the initial group bit loading using Equation 8.

In some implementations, $delta\_loss\_target_k$ denotes the difference between $Total\_Loss_k$ and the product of $Loss\_Target_k$ and Total_Bits. The system can compute the initial value for it as follows.

$$delta\_loss\_target_k = Total\_Loss_k - Loss\_Target_k \times Total\_Bits \quad \text{(Equation 18)}$$

In some implementations, $delta\_loss\_target\_update_{k,m}$ denotes the updated $delta\_loss\_target_k$ for CM k, if the system increase the group bit loading $BLG_m$ at mth segment from $BL\_add_{k,m,q}$-1 bits to $BL\_add_{k,m,q}$ bits. At step 4-3, the system can compute $delta\_loss\_target\_update_{k,m}$ for $1 \le m \le M\_seg$, $1 < k \le K$ as follows:

$$delta\_loss\_target\_update_{k,m} = delta\_loss\_target_{k+} (LV\_delta\_add_{k,m,q} - Loss\_Target_k) \times (BL\_add_{k,m,q} - BL\_add_{k,m,q-1}) \times ND_{k,m} \quad \text{(Equation 19)}$$

For those subcarriers which already use the highest QAM modulation in the group bit loading, no additional bit adjustment is needed, therefore, $delta\_loss\_target\_update_{k,m}$ is set to $delta\_loss\_target_k$ for them in step 4-3, and they are excluded from comparison in step 4-4 and 4-5.

In some implementations, at step 4-4, the system can compute the maximum value of $delta\_loss\_target\_update_{k,m}$ across all CMs at a given segment m as follows.

$$delta\_loss\_target\_update\_max_{m=} \max(delta\_loss\_target\_update_{k,m}) \text{ for } 1 \le k \le K \quad \text{(Equation 20)}$$

In some implementations, at step 4-5, the system can compute the minimum value of $delta\_loss\_target\_update\_max_m$ across all adjustable segments as follows, and denotes the segment index where the minimum value is as m_min.

$$delta\_loss\_target\_update\_min = \min(delta\_loss\_target\_update\_max_m),\ 1 \le m \le M\_seg \quad \text{(Equation 21)}$$

In some implementations, at step 4-6, the system can evaluate the following inequity:

$$delta\_loss\_target\_update\_min < 0 \quad \text{(Equation 22)}$$

In some implementations, if the inequity of Equation 22 is true, at step 4-7, the system can increase group bit loading $BLG_m$ min at subcarrier m_min by 1 level, set delta_loss_target$_k$ delta_loss_target_update$_{k,m}$ min. increase the q counter for $LV\_delta\_add_{k,m\_min,q}$ and $BL\_add_{k,m\_min,q}$ by 1, then return to step 4-3 to continue the iterative process of increasing the group bit loading.

In some implementations, if the inequity of Equation 22 is false, at step 4-8, the system compares delta_loss_target_update_min against 0. If delta_loss_target_update_min==0, the system can increase the group bit loading $BLG_m$ min at subcarrier m_min by 1 level and then complete the iterative process. Otherwise, if delta_loss_target_update_min>0, the system completes the iterative process directly without increasing the group bit loading.

In some implementations, a system (e.g., CMTS or a server) can perform a fourth version of the iterative optimization process to synthesize the joint bit loading profile for high net bit rate of a group of cable modems. Like the third version and different from the first and second version, it uses Loss_Value as the optimization criteria rather than Complement_Value, but the approach to initialize the group bit loading profile is different, thus the adjustment step is different (e.g., decrease the bit loading by 1 level rather than increase the bit loading by 1 level), and internal computation metrics are quite different due to the difference in the adjustment steps. The fourth version of the iterative optimization process is described as follows.

In some implementations, at step 5-1, the system takes input data, which may include: an list of RxMER vectors (e.g., $RxMER_{k,n}$ where k is the CM index and n is the subcarrier index, $1 \leq n \leq Ns$; $1 \leq k \leq K$), a plurality of Loss_Target for the group of CMs (e.g., $Loss\_Target_k$ for CM k), and a plurality of the constellation sizes for CMs, which provides information regarding the location of the continuous pilots, physical layer link channel (PLC), excluded subcarriers, data subcarriers, etc.

In some implementations, at step 5-2, the system may generate an initial bit loading for the group through the following steps and then based on it, compute a plurality of internal metrics needed for the optimization process.

In some implementations, $LV\_per\_bit_{k,m}$ denotes a loss value per bit for mth segment of CM k with a bit loading $BL_{k,m}$, and RxMER vector (e.g., $RxMER\_Vec_{k,m}$) corresponding to the data subcarriers in mth segment. The system can calculate $LV\_per\_bit_{k,m}$ using Equation 16. For a given $RxMER\_Vec_{k,m}$, $LV\_per\_bit_{k,m}$ increases as $BL_{k,m}$ increases.

In some implementation, the system can generate an initial bit loading $BL_{k,m}$ by assigning a minimum constellation size that maintains $LV\_per\_bit_{k,m}$ to be greater than $Loss\_Target_k$, which means with the initial bit loading $BL_{k,m}$, decrease the bit loading of any subcarrier by 1 level can cause that subcarrier's $LV\_per\_bit_{k,m}$ to be less or equal to $Loss\_Target_k$.

In some implementation, the system can generate the initial group bit loading $BLG_m$ for mth segment by taking the maximum value of $BL_{k,m}$ across all the CMs, which means with the initial bit loading $BLG_m$, the loss value per bit for the initial bit loading is greater than the $Loss\_Target_k$ for each CM in the group.

In some implementation, the system can set $BL_{k,m}=BLG_m$, and then compute $Total\_Loss_k$ using Equation 2 for each CM k.

In some implementation, $LV\_sub_{k,m,q}$ denotes an averaged loss value when the mth segment of CM k has an decrease in its bit loading by q levels (e.g., from 4 bit to 0 bits, 6 bits to 4 bits and 7 bits to 6 bits are all considered as decreasing by 1 level given the bit loading set equal to [0, 4, 6, 7, 8, 9, 10, 11, 12] bits). $LV\_delta\_sub_{k,m,q}$ denotes an normalized differential decrease in the averaged loss value of CM k when the mth segment has an decrease in its bit loading $BL_{k,m}$ from q−1th level to the qth level, it can be computed as follows:

$$LV\_delta\_sub_{k,m,q} = (LV\_sub_{k,m,q} - LV\_sub_{k,m,q-1}) / (BL\_sub_{k,m,q} - BL\_sub_{k,m,q-1}) \quad \text{(Equation 23)}$$

$BL\_sub_{k,m,q} - BL\_sub_{k,m,q-1}$ equals the number of bits decrease between the two adjacent QAM modulation levels. For example, assume $BL_{k,m}=7$, then $BL\_sub_{k,m,1}=6$, $BL\_sub_{k,m,2}=4$, and $BL\_add_{k,m,2}-BL\_add_{k,m,1}=-2$. The system can compute $LV\_delta\_sub_{k,m,q}$ up to the lowest QAM modulation. For example, given the bit loading set equal to [0, 4, 6, 7, 8, 9, 10, 11, 12] bits, and $BLG_m=7$, the system can compute $LV\_delta\_sub_{k,m,1}$, $LV\_delta\_sub_{k,m,2}$, $LV\_delta\_sub_{k,m,3}$ for bit loading decrease of 1 level (e.g., 6 bits), 2 levels (e.g., 4 bits), 3 levels (e.g., Obits). When q=0, $LV\_sub_{k,m,0}=LV_{k,m}$.

In some implementations, the system can compute Total_Bits of the initial group bit loading using Equation 8.

In some implementations, $delta\_loss\_target_k$ denotes the difference between $Total\_Loss_k$ and the product of $Loss\_Target_k$ and Total_Bits. The system can compute the initial value for it using Equation 18.

In some implementations, $delta\_loss\_target\_update_{k,m}$ denotes the updated $delta\_loss\_target_k$ for CM k, if the system decrease the group bit loading $BLG_m$ at mth segment from $BL\_sub_{k,m,q-1}$ bits to $BL\_sub_{k,m,q}$ bits. At, the system can compute $delta\_loss\_target\_update_{k,m}$ for $1 \leq m \leq M\_seg$, $1 \leq k \leq K$ as follows:

$$delta\_loss\_target\_update_{k,m} = delta\_loss\_target_{k+} (LV\_delta\_sub_{k,m,q} - Loss\_Target_k) \times (BL\_sub_{k,m,q} - BL\_sub_{k,m,q-1}) \times ND_{k,m} \quad \text{(Equation 24)}$$

For those subcarriers which already use the lowest QAM modulation in the group bit loading, no additional bit adjustment is needed, therefore, $delta\_loss\_target\_update_{k,m}$ is set to $delta\_loss\_target_k$ for them at step 5-3, and they are excluded from comparison in step 5-4 and 5-5.

In some implementations, at step 5-4, the system can compute the maximum value of $delta\_loss\_target\_update_{k,m}$ across all CMs at a given segment m using equation 20.

In some implementations, at step 5-5, the system can compute the minimum value of $delta\_loss\_target\_update\_max_m$ across all adjustable segments using Equation 21, and denotes the segment index where the minimum value is as m_min.

In some implementations, at step 5-6, the system can evaluate the following inequity:

$$delta\_loss\_target\_update\_min > 0 \quad \text{(Equation 25)}$$

In some implementations, if the inequity of Equation 25 is true, at step 5-7, the system can decrease group bit loading $BLG_m\_min$ at subcarrier m_min by 1 level, set $delta\_loss\_target_k = delta\_loss\_target\_update_{k,m}\_min$. increase the q counter for $LV\_delta\_sub_{k,m\_min,q}$ and $BL\_sub_{k,m\_min,q}$ by 1, then return to step 5-3 to continue the iterative process of decreasing the group bit loading.

In some implementations, if the inequity of Equation 25 is false, at step 5-8, the system can decrease the group bit loading $BLG_m\_min$ at subcarrier m_min by 1 level and then complete the iterative process.

Embodiments in the present disclosure have at least the following advantages and benefits. Embodiments in the present disclosure can provide useful techniques for providing customized bit loading profiles for a plurality of cable modems to achieve their respective performance goals (e.g., target performance, target bit rate, etc.). In conventional systems, because the DOCSIS specification can only support 16 bit loading profiles per OFDM channel, a system cannot provide profiles customized for each cable modem if there are many cable modems (e.g., the number of cable modem is greater than 16). Systems and methods according to some embodiments can determine bit loading profiles for a plurality of cable modems (CMs) using a group segmentation of a plurality of CMs. For example, a system (e.g., server 120 in FIG. 1 or server 320 in FIG. 3) can divide CMs into a plurality of subsets (e.g., four quadrants) based on customized bit rates of the CMs (e.g., a net bit rate per subcarrier that a CM can achieve) compared with capacity requests for the CMs (e.g., a target bit rate per subcarrier of a CM), thereby providing customized bit loading profiles for a plurality of cable modems to achieve their respective performance goals. Systems and methods according to some embodiments can synthesize bit loading profile for a group of CMs through an iterative optimization process.

Referring to FIGS. 3-8, embodiments of systems and methods for the present solution to perform group segmentation and generate corresponding joint bit loading profile for each group of CMs are described and illustrated.

Figure 3:
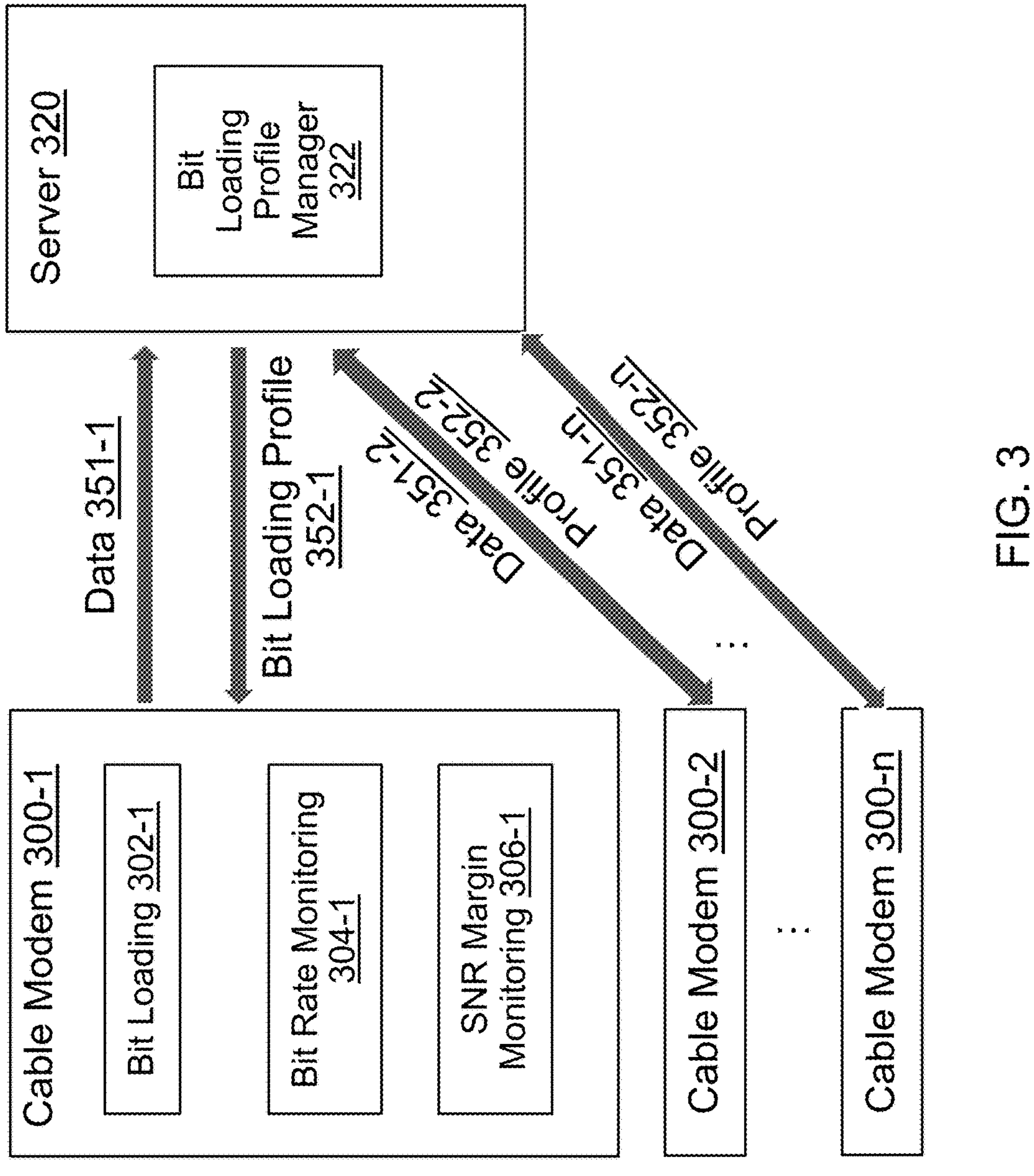
FIG. 3 is depicting an example process for determining bit loading profiles for cable modems, according to one or more embodiments.
Figure 4A:
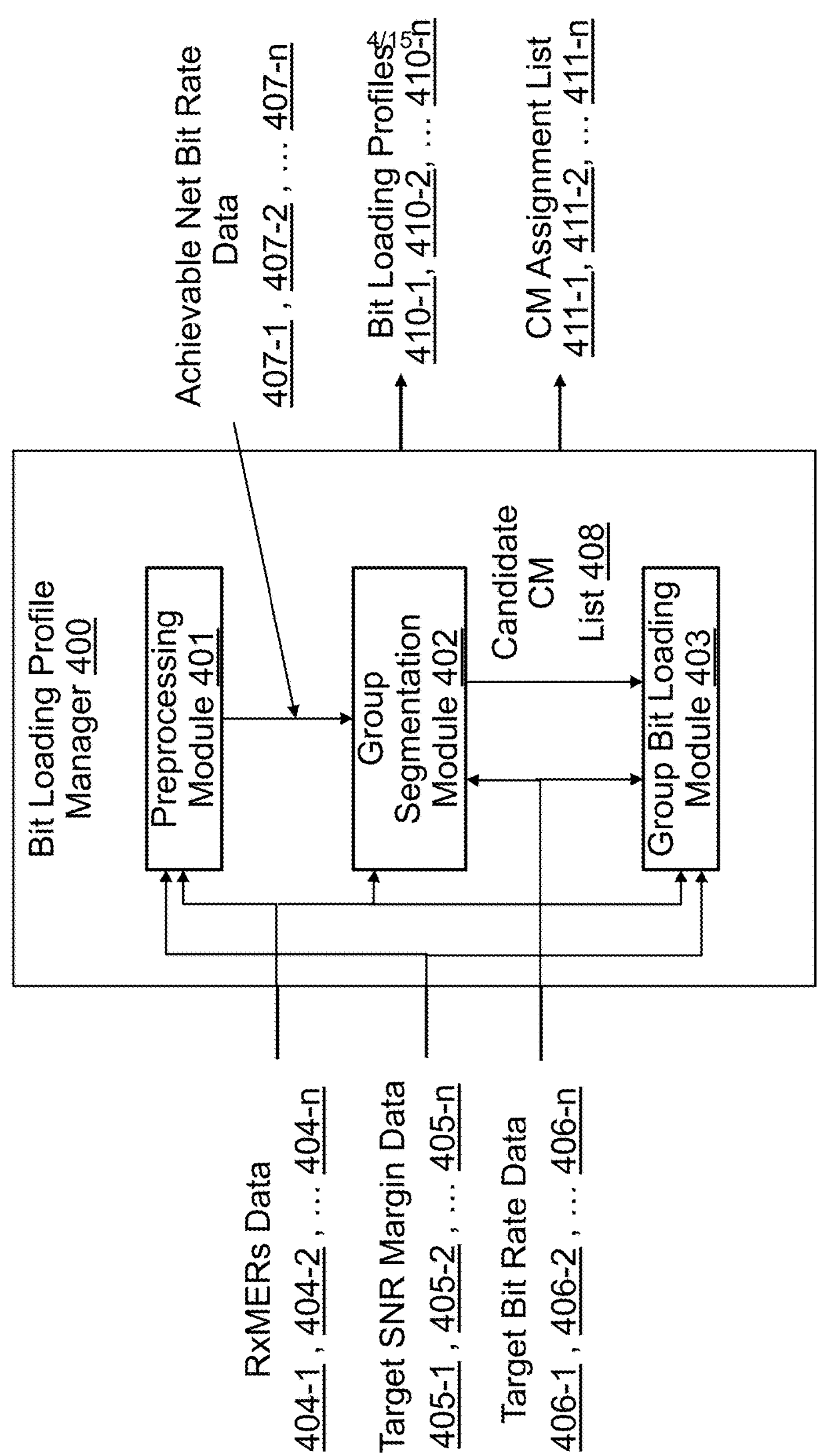
FIG. 4A is a diagram depicting an example bit loading profile manager, according to one or more embodiments.

FIG. 3 is a diagram depicting an example communication environment 3000 with a plurality of CMs 300-1, . . . , 300-*n* and a server 320 for determining bit loading profiles for the plurality of CMs, according to one or more embodiments. Each of the plurality of CMs 300-1, . . . , 300-*n* and the server 320 can have configuration similar to configuration of computing system 2000. A CM 300-1 (among the plurality of CMs) can manage 302-1 bit loading of the cable modem. The CM 300-1 can perform bit rate monitoring 304-1 to output an achievable average net bit rate per subcarrier of the CM 300-1. The CM 300-1 can perform SNR margin monitoring 306-1 to output an SNR margin of the CM 300-1. The cable modem 300-1 can send data 351 including RxMERs (e.g., Averaged RxMER value for each subcarrier), bit rate data (e.g., achievable average net bit rate per subcarrier of the CM 300-1) and/or SNR margin data (e.g., SNR margin of the CM 300-1), to the server 320. In response to receiving the data 351, the server 320 can determine (or generate or identify) bit loading profiles 352-1, 352-2, . . . , 352-*n* for the plurality of CMs 300-1, 300-2, . . . , 300-*n*, and send the bit loading profiles 352-1, 352-2, . . . , 352-*n* to the plurality of CMs 300-1, 300-2, . . . , 300-*n*, respectively. In response to receiving the bit loading assignment, the CM 300-1 (and other CMs similarly) can perform bit loading using the bit loading profile 352-1. FIG. 4A is a diagram 4000 depicting an example bit loading profile manager 400, according to one or more embodiments. A system (e.g., a server 120, 320) can include a bit loading profile manager 400, which contains a preprocessing module 401, a group segmentation module 402 and a group bit loading module 403. The bit loading profile manager 400 can be implemented in hardware (e.g., circuitry or processor), firmware, software, or a combination thereof. The bit loading profile manager 400 can receive, as input data, RxMERs 404-1, 404-2, . . . , 404-*n* (e.g., average RxMER for each subcarrier of the CM 300-1, 300-2, . . . , 300-*n*), a Target SNR margin data 405-1, 405-2, . . . , 405-*n* (e.g., Target SNR margin of the CM 300-1, 300-2, . . . , 300-*n*), and a target bit rate data 406-1, 406-2, . . . , 406-*n* (e.g., target bit rate of the CM 300-1, 300-2, . . . , 300-*n*). The preprocessing module 401 takes RxMERs (e.g., 404-1, 404-2, . . . , 404-*n*) and target SNR margin (e.g. 405-1, . . . , 405-*n*) as input and compute the achievable net bit rate for each CM. In some embodiments, the preprocessing module employs an algorithm for optimizing bit loading profiles for cable modems as described in U.S. patent application Ser. No. 19/040,275 which is incorporated by reference herein. The bit loading profile manager 400 uses the computed achievable net bit rate for each CM as additional input information, performs an group bit loading process based on the RxMERs data, and/or the SNR margin data, and/or the target bit rate data, and output bit loading profiles 410-1, 410-2, . . . , 410-*n*. The group bit loading process is iterative in nature and comprises two key modules: group segmentation module 402 and group bit loading module 403. Group segmentation module 402 serves as the primary driver of the process (e.g., process 600), and during each iteration, it comes up with a new candidate CM list and calls upon the group bit loading module 403 to compute the corresponding joint bit loading profile. Group segmentation module 402 will then determine whether the outcome of the group bit loading module 403 meet the requirement of target bit rate for this candidate group and decide the next step operation accordingly.

Figure 4B:
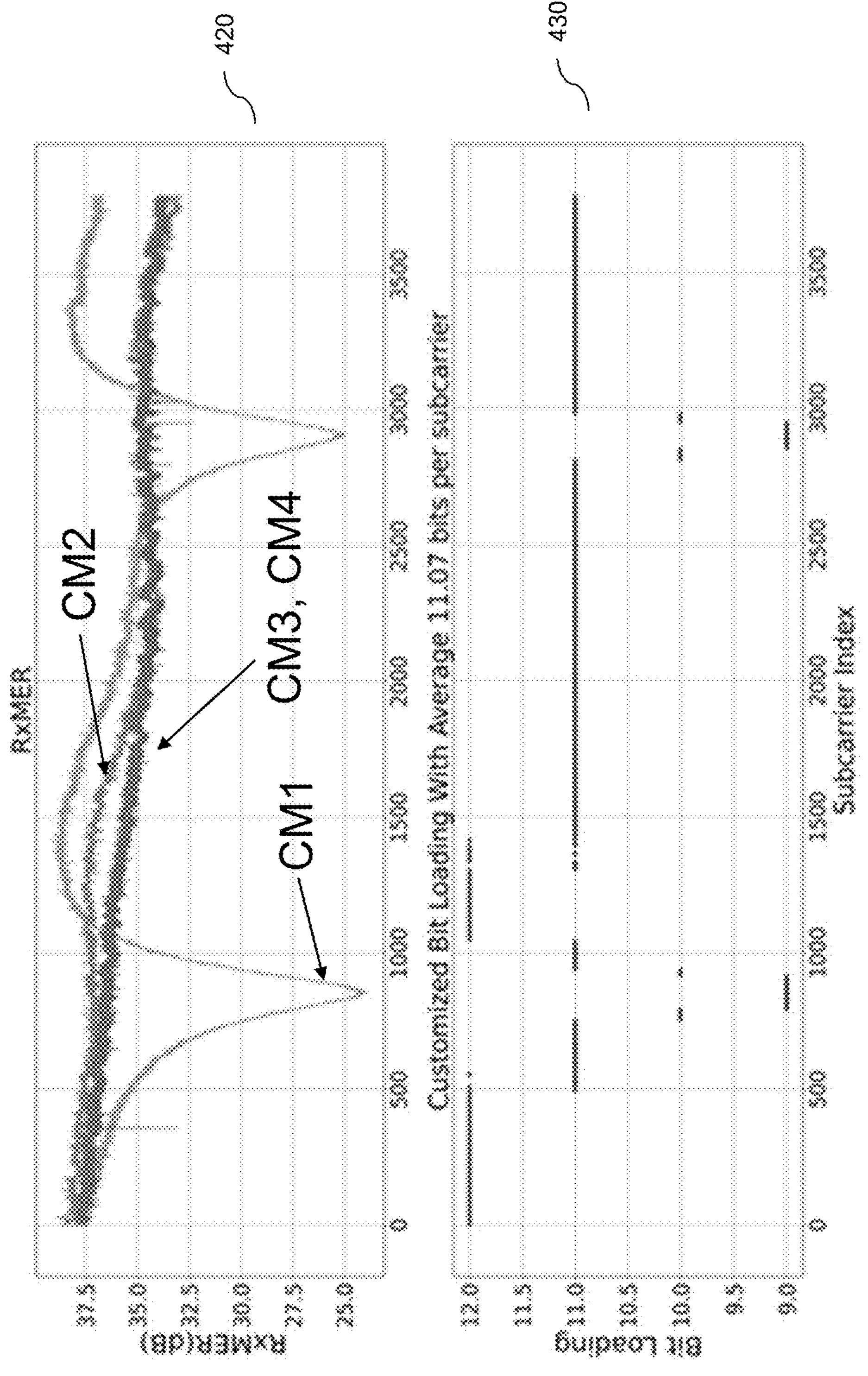
FIG. 4B is an example of customized bit loading profile for four CMs, according to one or more embodiments.

FIG. 4B is an example of customized bit loading profile for four CMs. The RxMER value for each subcarrier of four different CMs is plotted in 420 with four different curves (one curve for each of the four CMs) with an x-axis of subcarrier index, a y-axis of RxMER value in dB for each of the four CMs. A joint bit loading profile for the group is shown in 430 with a y-axis of bit loading. The group bit loading module addresses the two deep notches of a CM by applying lower bit loading at these notch locations. It also recommends higher bit loading at the left edge of the band compared to the right edge, aligning with the tilt shape of the RxMER for the other three CMs.

Figure 5:
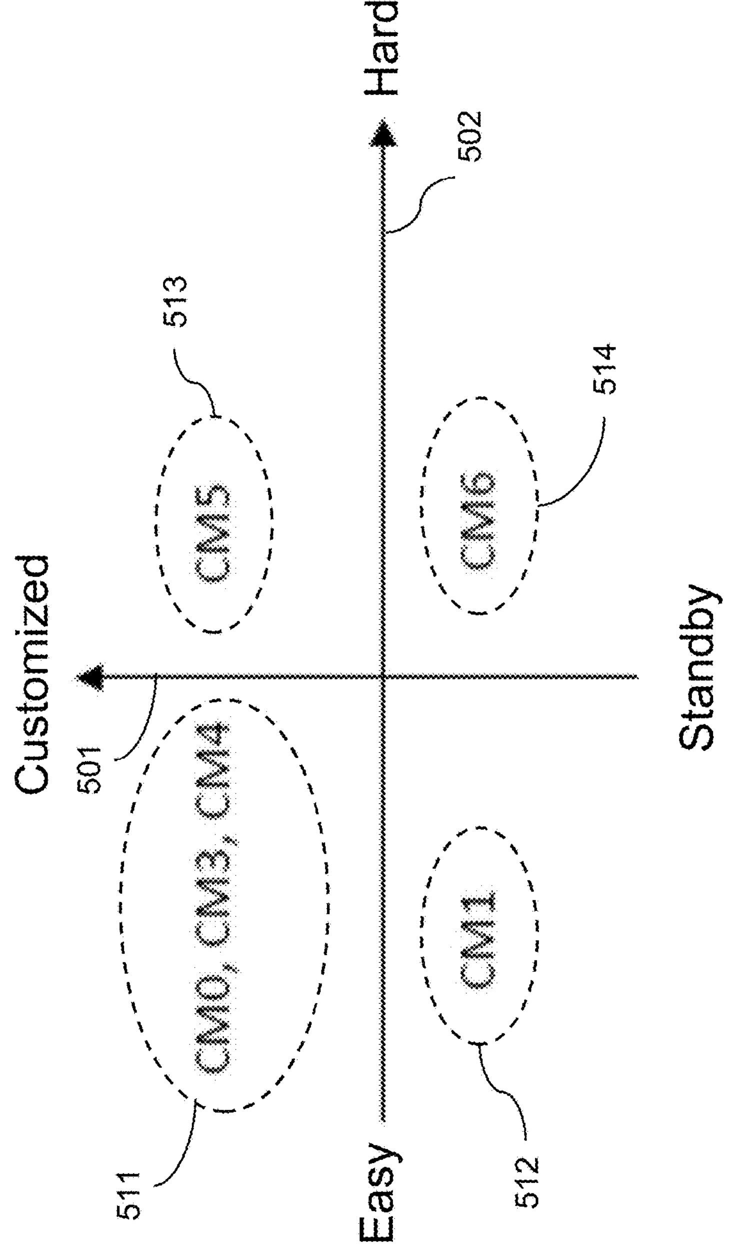
FIG. 5 is a diagram depicting an example of four quadrants representing four subgroups (subsets) of CMs, according to one or more embodiments.

FIG. 5 is a diagram 500 depicting an example of four quadrants 511, 512, 513, 514 representing four subgroups (subsets) of CMs (e.g., CM-0, CM-1, CM-2, CM-3, CM-4, CM-5, CM-6), according to one or more embodiments. The system can divide a plurality of CMs into four quadrants with an x-axis of channel impairment level 502 and a y-axis of service level 501 (e.g., target bit rate). The system (e.g., server 120, 320) can perform a four quadrants division, with the following configuration and/or parameters: (1) an achievable net bit rate (e.g., an average net bit rate) for each CM (e.g., among 7 CMs including CM0, CM1, CM2, CM3, CM4, CM5, CM6) as specified in a customized bit loading table is listed as follows: CM0: 11.7, CM1: 11.2, CM2: 7.5, CM3: 11.5, CM4: 11.6, CM5: 11.2, and CM6: 11; (2) a target bit rate for each CM as follows: CM0: 11, CM1: 10.5, CM2: 10.5, CM3: 11, CM4: 11, CM5: 11, CM6: 8; (3) CM0, CM1, CM3 and CM5 have AWGN with a mild tilt; and (4) each of CM 5 and CM6 has a bigger ripple impairment. In performing customized group bit loading with a target bit rate of 11 bits, CM0, CM1, CM3, CM4, CM5 and CM6 are chosen as candidates for this group because they all have achievable net bit rate higher or equal to the target bit rate of 11 bits. In addition, CM0, CM3, CM4, CM5 have a target bit rate of 11 bits, CM1 and CM2 have a target bit rate of 10.5 bits, CM5 and CM6 has more severe channel impairments than CM0, CM1, CM3 and CM4, therefore, the system can assign CM0, CM3, CM4 to the customized bit loading with easy channel impairment quadrant 511. The system can assign CM 5 to the customized bit loading with hard channel impairment quadrant 513. The system can assign CM1 to the standby with easy channel impairment quadrant 512 and CM6 to the standby with hard channel impairment quadrant 514. Assuming the lowest target bit rate in the customized bit rate list is 9, the system can exclude CM2 with achievable net bit rate per subcarrier<9 from profile allocation.

Figure 6A:
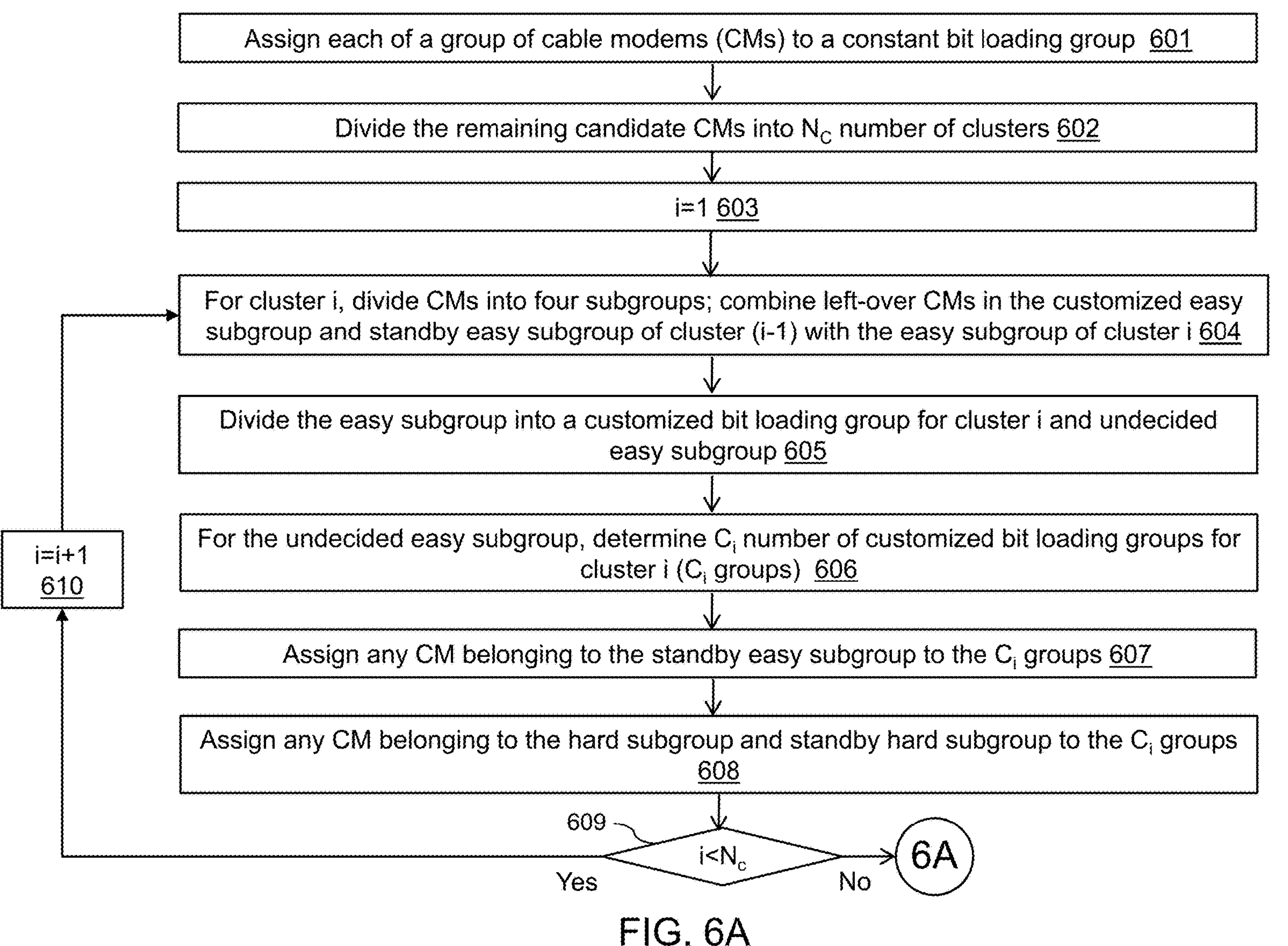
FIG. 6A and FIG. 6B are flow diagrams showing a process for determining bit loading profiles for cable modems, according to one or more embodiments.
Figure 6B:
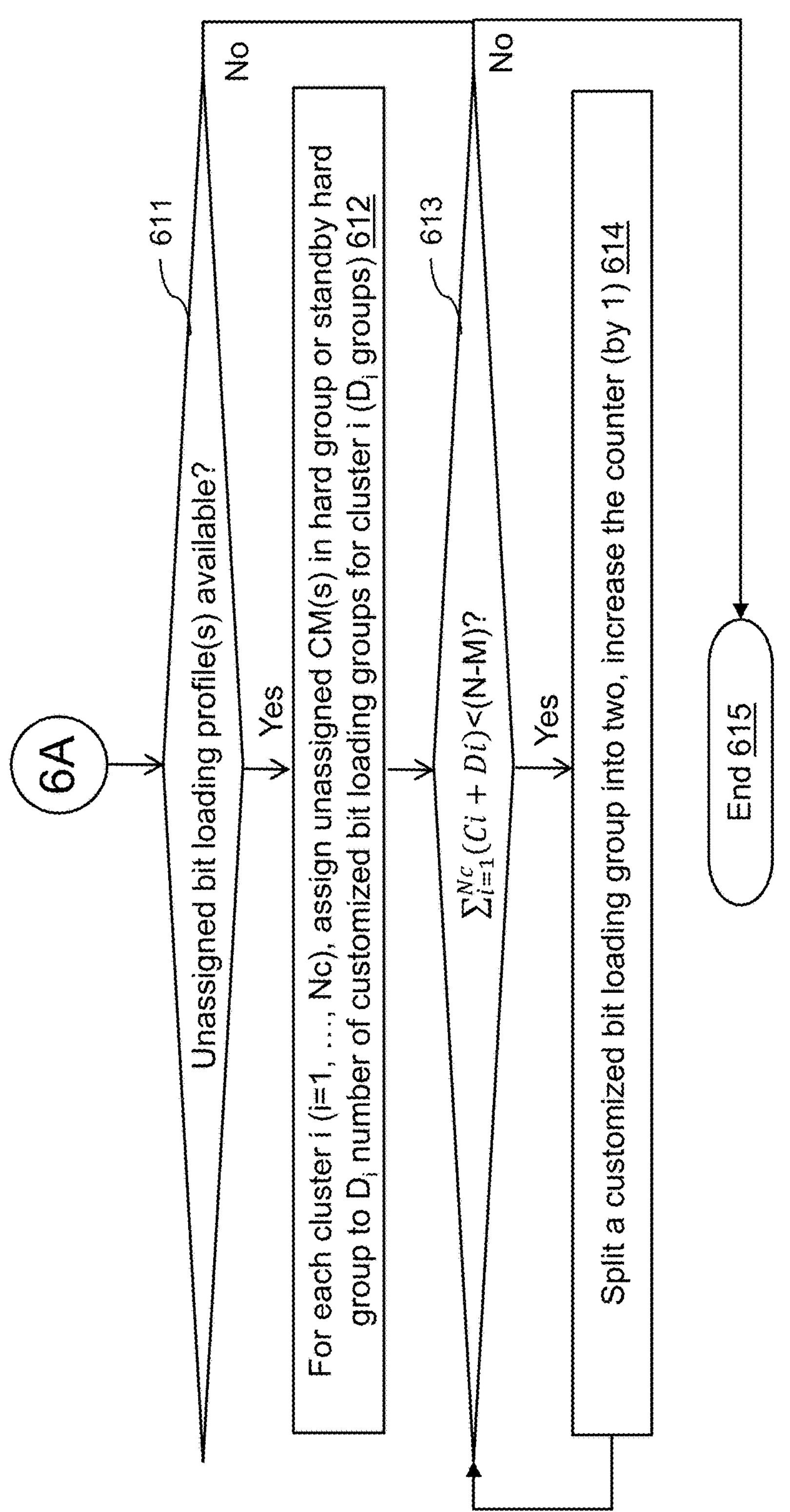

FIG. 6A and FIG. 6B are a flow diagram showing a process 600 for determining bit loading profiles for cable modems, in accordance with an embodiment. The process 600 is performed by one or more processors of a server (e.g. processor 2010 of server 120, 320). In other embodiments, the process 600 is performed by other entities (e.g., a computing system other than the server 120, 320, for example CMTS). The process 600 includes more, fewer, or different steps than shown in FIG. 6A and FIG. 6B. A system (e.g., a server 120, 320) can perform the process 600 for determining bit loading profiles for a plurality of CMs as follows.

At (process) step 601, the system can assign the following CMs to a constant bit loading group: CMs having (1) an (achievable) average bit rate per subcarrier such that the average bit rate a highest constant bit loading rate<a programmable threshold (e.g., default value=1); and (2) a highest constant bit loading rate that belongs to the constant bit loading list. The system can determine those CMs left unassigned during this step 601 as candidate CMs for customized bit loading.

A target total number of profiles can be equal to N (N is an integer greater than 1), and a total number of constant bit loading profiles can be equal to M (M is an integer), then the total number of customized bit loading profiles can be equals to N-M. At step 602, the system can first cluster (or divide or classify) those unassigned CMs into Ne number of different candidate clusters (or candidate sets) based on respective values of (achievable) average bit per subcarrier of the unsigned CMs.

For example, assume 12 bits is the highest QAM modulation used in a system, given the customized bit loading list=[12, 11, 10.5, 8], the system can generate three clusters of CM, such that (1) CMs with an achievable net bit rate per subcarrier>=11 belong to cluster 1; (2) CMs with 10.5<=an achievable net bit rate per subcarrier<11 belong to cluster 2; (3) CMs with 8<=an achievable net bit rate per subcarrier<10.5 belong to cluster 3. The system can exclude CMs with achievable net bit rate per subcarrier<8 from profile allocation and report and/or include the CMs in a dropout CM list as an insight to the MSO. At step 603, the system can set a variable i to indicate cluster i.

At step 604, for non-empty cluster i, the system can divide (or cluster or classify) CMs in the cluster i into four subgroups (or subsets) including (1) customized easy (channel impairment) subgroup, (2) standby easy (channel impairment) subgroup, (3) customized hard (channel impairment) subgroup, and/or (4) standby hard (channel impairment) subgroup. The system can combine left-over (or unassigned) CMs in the customized easy subgroup and standby easy subgroup of the previous cluster (cluster (i−1)) with the customized easy subgroup of the current cluster (cluster i). In some implementations, the system can combine left-over (or unassigned) CMs in the customized hard subgroup and standby hard subgroup of the previous cluster (cluster (i−1)) with the customized hard subgroup of the current cluster (cluster i).

In each non-empty cluster (or set), the system can further divide CMs in the cluster into an easy subgroup (or easy subset) and a hard subgroup (or hard subset) base on two possible approaches (as described below), and then apply the target (or desired) rate table to generate a standby group in which those CMs do not impact the customized bit loading profile. The first approach can calculate, for each CM, a value of (an achievable average bit per subcarrier-a highest constant bit loading rate), and if the value is less than a programmable bit rate threshold, the CM can belong to the easy subgroup. If the value is greater than or equal to the programmable bit rate threshold, the CM can belong to the hard subgroup. The second approach can draw or use a plot with x axis as achievable net bit rate per subcarrier, and y axis as average RxMER for a given CM. Those CMs whose achievable net bit rate per subcarrier and average RxMER value gathers around a linear line can belong to the easy subgroup and others CMs can belong to the hard subgroup. The system can use a linear relationship (or a linear line) for AWGN channel as the ideal reference, and measure the distance from the linear line to the given CM. If the distance is above (or greater than) a given deviation threshold, the system can determine that this CM belongs to the hard subgroup. The system can examine both easy and hard subgroups and gather together those CMs who has a target (desired) rate (e.g., 10.5) lower than a target customized bit loading rate for the cluster (e.g., 11) and put the CMs into a standby easy subgroup and/or a standby hard subgroup.

The system can first produce customized bit loading for each easy subgroup in the candidate clusters, while the system can generate customized bit loading for the easy subgroup of cluster 1 first.

At step 605, the system can divide the non-empty easy subgroup into a customized bit loading group for cluster i and an undecided easy subgroup. The system can evaluate the achievable average net bit rate of the joint bit loading for those CMs in the easy subgroup. In response to determining that the achievable average net bit rate of the joint bit loading is above or equal to a target customized bit loading rate, then the CMs can form the customized bit loading group 1, and the undecided easy subgroup can be null. However, in response to determining that the achievable average net bit rate of the joint bit loading is below the target customized bit loading rate, then the system can decide what are the CMs that need to be removed from the easy subgroup so that the final achievable average net bit rate of the remaining CMs is above or equal to the target customized bit loading rate. For each CM in the easy subgroup, the system can test or calculate a new achievable group bit rate (e.g., an average bit rate per subcarrier for the joint bit loading of the remaining CMs) if the CM is removed from the subgroup. The system can relocate whichever CM that produces the highest new achievable group bit rate, to an undecided easy subgroup, and continue the process until the joint bit loading with remaining CMs can generate an achievable group bit rate higher than the target customized bit loading rate. At the end of step 605, the easy subgroup can be divided into customized bit loading group 1 and the undecided easy subgroup.

At step 606, the system can determine that there are CMs left in the undecided easy subgroup, and N-M-L>1, where L denotes the total number of non-empty clusters, which means that there are additional customized bit loading profile that can be used for this undecided easy subgroup. The system can perform step 605 again with the undecided easy subgroup as the candidate. At the end of step 606, the system can generate $C_i$ customized bit loading groups ($C_i$ is an integer greater than or equal to 1) from CMs belonging to the non-empty initial easy subgroup of cluster i.

At step 607, for those CMs belong to the standby easy subgroup, the system can evaluate the SNR margin of each CM in the standby easy subgroup given the bit loading of the $C_i$ customized bit loading groups, and assign each CM belonging to the standby easy subgroup to the group (among the $C_i$ customized bit loading groups) with the highest net bit rate and the SNR margin above an SNR margin threshold.

At step 608, for each CM in the customized hard subgroup and standby hard group, the system can evaluate the SNR margin of each CM in the customized hard subgroup and standby hard group given the bit loading of the $C_i$ customized bit loading groups, and assign CMs belonging to the customized hard subgroup and standby hard group to the group (among the $C_i$ customized bit loading groups) with the highest net bit rate and the SNR margin above the SNR margin threshold. At step 609, the system can compare the current value of i with the total number of clusters $N_c$. In response to determining that i is equal to Ne, the system can proceed to step 611, otherwise, the system can proceed to step 610. At step 610, the system can increase the variable i by 1 indicating the next cluster and proceed to step 604.

At step 604, the system can combine the left over CMs in the customized easy subgroup and standby easy subgroup of the previous cluster (e.g., cluster 1) with the customized easy subgroup of the current cluster (e.g., cluster 2), and repeat step 604 to 608 to generate customized bit loading groups for the current cluster. In step 606, if the variable i equals 2 (indicating that cluster 2 is being processed), in evaluating whether there is additional customized bit loading profile to use, the system can determine or confirm that a value of (N-M-C1-C2-(L−2)) is greater than 1, where L−2 means there are at least 1 profile left for each of the remaining non-empty clusters. The system can repeat the process (e.g., steps 604 to 610) to finish group segmentation with corresponding joint bit loading for the easy subgroup of all clusters.

At step 611, the system can compare the total number of customized bit loading profiles that are used (or assigned) with the total number of available customized bit loading profiles to determine whether there is still any bit loading profile available.

At step 612, in response to determining that there are one or more bit loading profiles available, the system can determine whether there are unassigned CM in customized hard subgroup for each cluster. In response to determining that there are unassigned CM in customized hard subgroup, the system can perform group segmentation with joint bit loading for those CMs. The system can perform the group segmentation to generate a new customized bit loading group using one method of (1) an add-up method or (2) a subtract method.

The add-up method can start with the customized hard group of the cluster having the highest achievable net bit rate, and pick (or select or choose or determine) from the cluster, a CM with the highest net bit rate gain. A net bit rate gain is defined as a value of (an achievable net bit rate-a constant bit rate). The system can use the highest net bit rate gain as a seed vector, and compute the joint bit loading of the CM with each other CM in the group, pick (or select or choose or determine) the other CM which produces the highest net bit rate for the joint bit loading profile to join this seed CM to form the pair. The system can repeat this process to add other CMs to the new customized bit loading group if the outcome net bit rate of the joint bit loading profile is higher or equal to the target net bit rate for the cluster.

The subtract method can start with the customized hard group of the cluster with the highest net bit rate. In response to determining that the net bit rate of the joint bit loading profile of the customized hard group is higher than or equal to the target net bit rate of the cluster, the system can form a new customized bit loading group. Otherwise, In response to determining that the net bit rate of the joint bit loading profile of the customized hard group is lower than the target net bit rate of the cluster, the system can attempt to remove one CM from the customized hard group which can improve the net bit rate of the joint bit loading profile of the remaining CMs the most, and continue this process until the outcome net bit rate is higher than or equal to the target net bit rate for the cluster.

In response to determining that (1) there are still unassigned CM in the hard group, and (2) there is available bit loading profile, the system can continue this process (step 612). Assuming $D_i$ customized bit loading profiles are generated (from cluster i) in this process, for each CM in the standby hard group (of cluster i), the system can evaluate an SNR margin of the CM given the $D_i$ customized bit loading profiles, the system can assign the CM to the group with the highest net bit rate and the SNR margin above the SNR margin threshold.

In response to determining that there is no additional bit loading profile available (in step 611), the system can proceed to step 615 to stop the iteration, and for each left unassigned CM in the group segmentation process, the system can evaluate its SNR margin given all the customized bit loading profiles, assign the CM to the group with the highest net bit rate and the SNR margin above the SNR margin threshold. In response to determining that this group net bit rate is lower than this CM's target bit rate, the system can report it as an insight to MSO identifying customers with performance deficiencies. For all the remaining unassigned CMs, the system can report them as left over CMs in the group segmentation process. The MSO can either reduce the target bit rate or increase the total number of profiles to adjust the group bit loading outcome for better coverage. Alternatively, MSO can schedule on-site service operation to resolve the field issues causing poor performance for these CM. Otherwise, in response to determining that there is available bit loading profile and no unassigned CM in the customized hard group of current cluster, the system can move unassigned CM in the standby hard group of current cluster to the customized hard group of next cluster and continue this process (step 612). The system can finish or complete this iteration until there is no unassigned CM in customized hard group. It is noted that in the last cluster, there is no standby group, because the lowest target bit rate of CM is equal to the lowest customized bit rate in the last cluster.

At step 613, the system computes the total number of bit loading profiles used by customized easy group and customized hard group for all the clusters, which is defined as $$\sum_{i=1}^{Nc}(Ci+Di),$$

and compare it with the total number of available customized bit loading profiles N-M. if $$\sum_{i=1}^{Nc}(Ci+Di)<N-M,$$

it means there are one or more additional customized bit loading profile to use, the system continues to step 614, otherwise, it proceed to step 615 to complete the process. For example, if $N_c=4$, the inequality can be (C1+C2+C3+C4+D1+D2+D3+D4)<N-M.

At step 614, the system can split a customized bit loading group into two to improve the total capacity. For each customized bit loading group, the system can compute the total achievable bit rate (=sum of the achievable net bit rate for each CM in the group), achievable by the group of CMs if customized bit loading profile is used for each CM, and subtract the total group bit rate (=bit rate of the joint bit loading profile for the group*number of CMs). The output of the subtraction can be the measurement of the potential loss for this group by utilizing a single common bit loading profile. The system can normalize the loss by the size of the group and pick the group with the highest normalized loss as the candidate group for splitting.

The system can pick the CM which has the highest loss in the group as a seed CM, and attempt to pair the seed CM with other CMs in the group, then choose the other CM which produces the highest net bit rate for the joint bit loading profile to join this seed CM to form the pair if the outcome net bit rate is higher than the initial group net bit rate. The system can repeat this process to add other CMs to this new customized bit loading group if the outcome net bit rate is higher than the initial group net bit rate. After completing the bit loading group split, the system can increase the corresponding counter Ci or Di for the associated cluster, and then proceed to step 613 to check for availability of additional bit loading profile.

At step 615, the system may complete the group segmentation process and outputs each constant bit loading profile and customized bit loading profile together with the list of CMs assigned to each profile. If there are dropout CMs, unsigned CMs or assigned CMs with a bit loading profile lower than its target bit rate, the system may report them to MSO as insight for further performance improvement.

In some implementations, the system may choose to simplify the group segmentation process without differentiating the easy and hard channel conditions and use only two subgroups in each cluster: (1) customized bit loading group, (2) standby group. In such simplified implementations, the system may perform the same iterative process as defined earlier for easy customized bit loading group and easy standby group (e.g., steps 614 to 610) to achieve group segmentation for the customized bit loading group and standby group of all clusters. If there are one or more additional bit loading profiles to use after the group segmentation of all the clusters, the system can split a customized bit loading group into two to improve the total capacity iteratively (e.g., step 613 and 614) until all available customized bit loading profiles (e.g., N-M) are used.

Figure 7A:
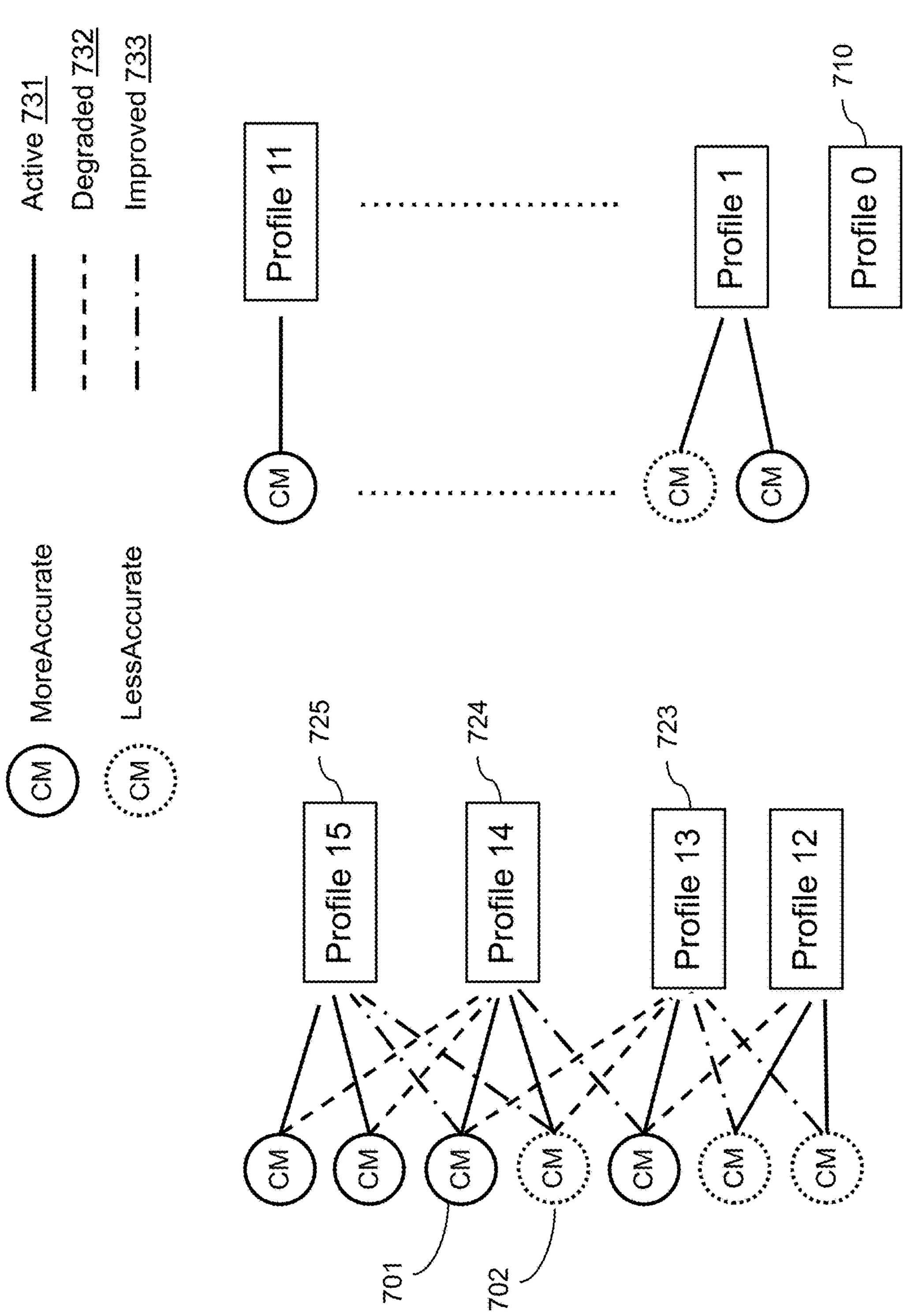
FIG. 7A and FIG. 7B are diagrams depicting example configurations of bit loading profiles for cable modems, according to one or more embodiments.
Figure 7B:
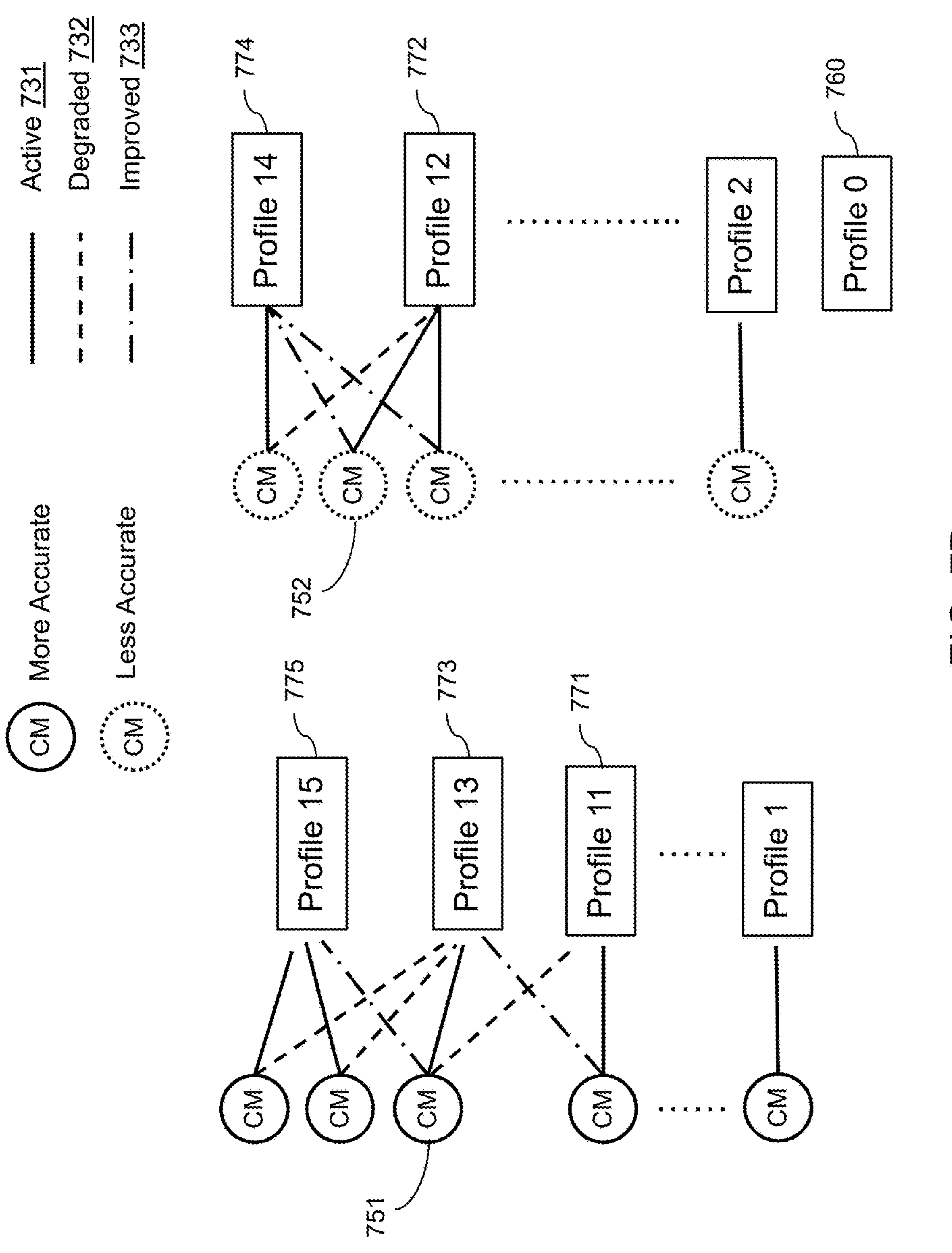

FIG. 7A and FIG. 7B are diagrams 700, 750 depicting example configurations of bit loading profiles for cable modems, according to one or more embodiments. Given a set of bit loading profiles (e.g., 16 bit loading profiles including Profile 0, Profile 1, . . . , Profile 15), the system (e.g., system 120, 320) can assign each profile to a plurality of CMs (e.g., CMs 701, 702, 751, 752 produced by different measurement or accuracy knowledge of the CMs' "Loss_Target" (e.g., MoreAccurate based CMs and LessAccurate based CMs). For the profile assignment, the system can input information from each CM. The input information can include at least one of (1) a unique identification number, (2) Channel ID (e.g., channel band 1, 2, 3, 4, 5, etc.), (3) an RxMER vector (e.g., averaged RxMER), (4) a bit loading mask (e.g., identifying location of continuous pilots, PLC pilots, exclusion bands), and/or (5) whether each CM is a MoreAccurate based device (chip version and vendor) or a LessAccurate based device. For the profile assignment, the system can use system control parameters which include at least one of (1) a target SNR margin for MoreAccurate-based device, (2) a target SNR margin for LessAccurate based device, (3) a total number of profiles that the system (e.g., server 120, 320) provides to a CMTS.

The system can assign each profile to a plurality of CMs using at least one method of (1) a unified profile allocation (see FIG. 7A) or (2) a non-unified profile allocation (see FIG. 7B). The non-unified profile allocation can be performed by splitting apart MoreAccurate based CMs from LessAccurate based CMs, and as a result, the system may lose efficiency with the number of custom bit loading profiles available for bit loading optimization. On the other hand, in the unified profile allocation method, the system can dial in more margin for LessAccurate based CMs than margin commanded by an SNR margin goal (e.g., target SNR margin). The amount of additional margin can be a selectable parameter invisible to the operator. As a result, LessAccurate based CMs can receive a lower net bit rate for the same RxMER vector than a net bit rate received by MoreAccurate based CMs. From MoreAccurate's standpoint, technically the unified approach can be better, while MoreAccurate's marketing team may prefer to present/sell the non-unified approach because there might be marketing advantage of treating LessAccurate based CMs explicitly as less capable.

Referring to FIG. 7A, the system can perform a unified method of profile management allocation. The unified profile allocation method can include (1) segmenting (or grouping) CMs based on similar channel capacity and characteristics, (2) proposing a bit loading profile that fits each group, (3) identifying a next bit loading profile for each CM and/or each channel when the CM's performance improves or degrades, and/or (4) reporting the expected SNR margin for each CM and/or each channel and profile pair. Profile 0 (710) can be set as the default profile, and bit rates of the set of profiles can be such that Profile 15>Profile 14>Profile 13> . . . >Profile 1>Profile 0. Each CM can have three additional assigned profiles including an active profile in use (e.g., active link 731), and two profiles to switch to (e.g., links 733, 732) when performance of the CM improves or degrades. For example, CM 701 has an active profile 724, an improved profile 725, and a degraded profile 723. Similarly, CM 702 has the active profile 724, the improved profile 725, and the degraded profile 723. The system can report and/or monitor the SNR margin value for each CM and/or each channel to profile pair, since different CM/channel in the same group could have different SNR margin given the same assigned bit loading profile.

Referring to FIG. 7B, the system can perform a non-unified method of profile management allocation. The non-unified profile allocation method can include (1) segmenting MoreAccurate based CMs and LessAccurate based CMs separately based on their channel capacity and characteristics, (2) proposing a bit loading table fit each group, (3) identifying a next bit loading profile for each CM and/or each channel when the CM's performance improves or degrades, and/or (4) reporting the expected SNR margin for each CM and/or each channel and profile pair. Bit rates of the set of profiles can be such that Profile 15>Profile 13> . . . >Profile 1, and Profile 14>Profile 12> . . . >Profile 2. Profile 0 (760) can be reserved as default profile, and Profile 1, 3, . . . 15 can be used for MoreAccurate based CMs and Profile 2,4, . . . , 14 can be used for LessAccurate based CMs. CM 751 has an active profile 773, an improved profile 775, and a degraded profile 773. Similarly, CM 752 has an active profile 772 and an improved profile 774.

Figure 8:
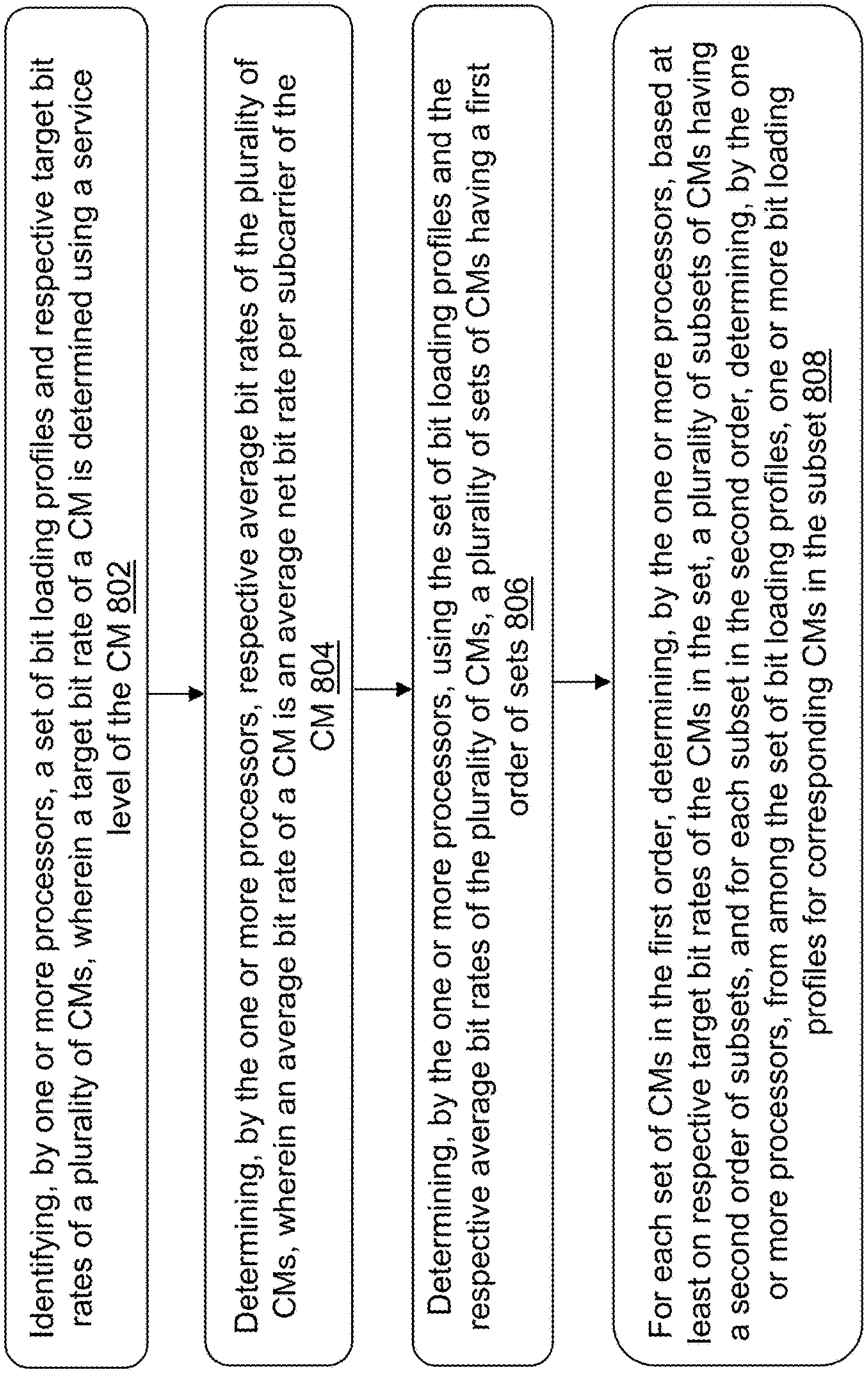
FIG. 8 is a flow diagram showing a process for determining bit loading profiles for cable modems, according to one or more embodiments.
Figure 9A:
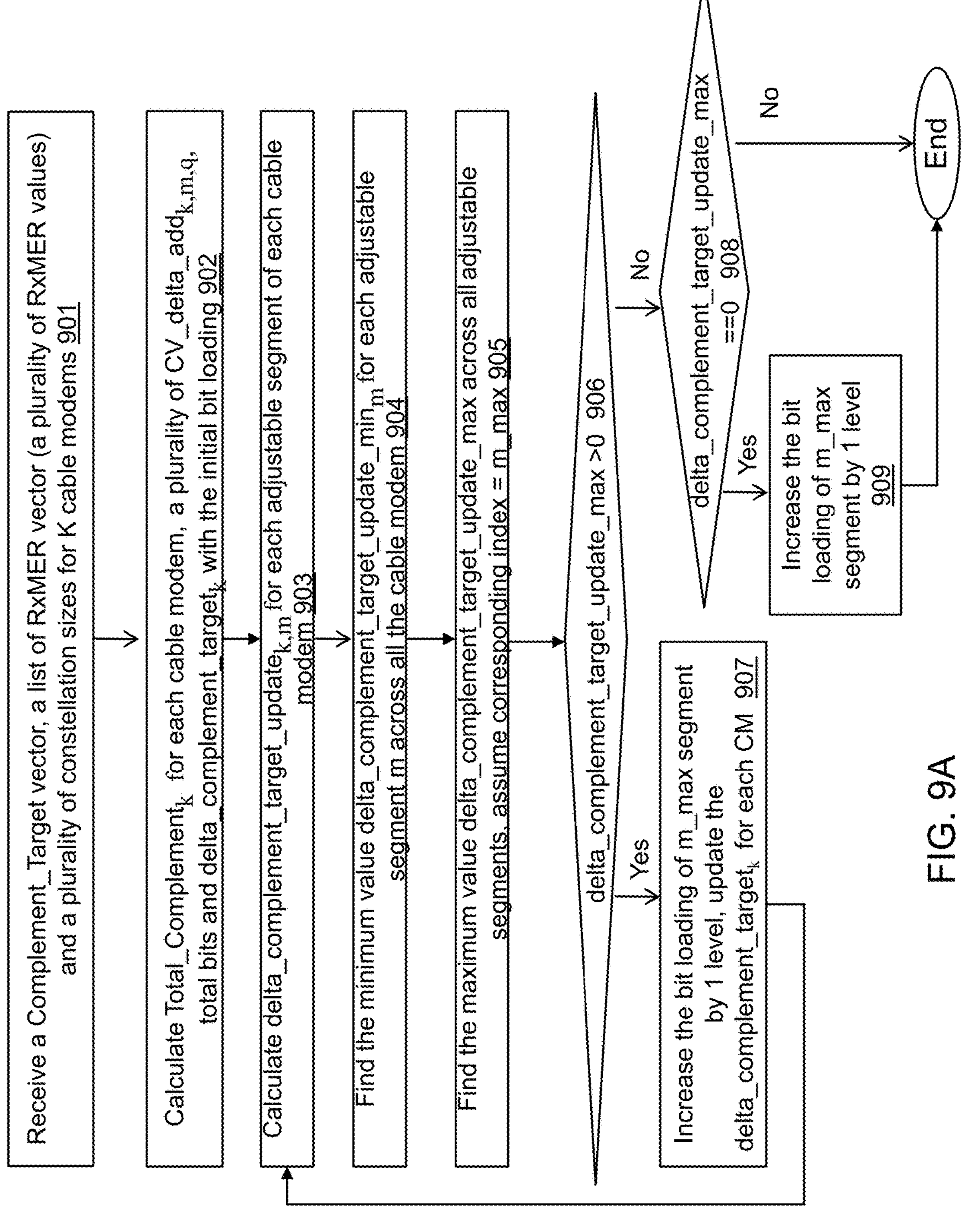
FIG. 9A, FIG. 9B, FIG. 9C, FIG. 9D are flow diagrams showing processes of iterative optimization for joint bit loading profile of a group of cable modems.
Figure 9B:
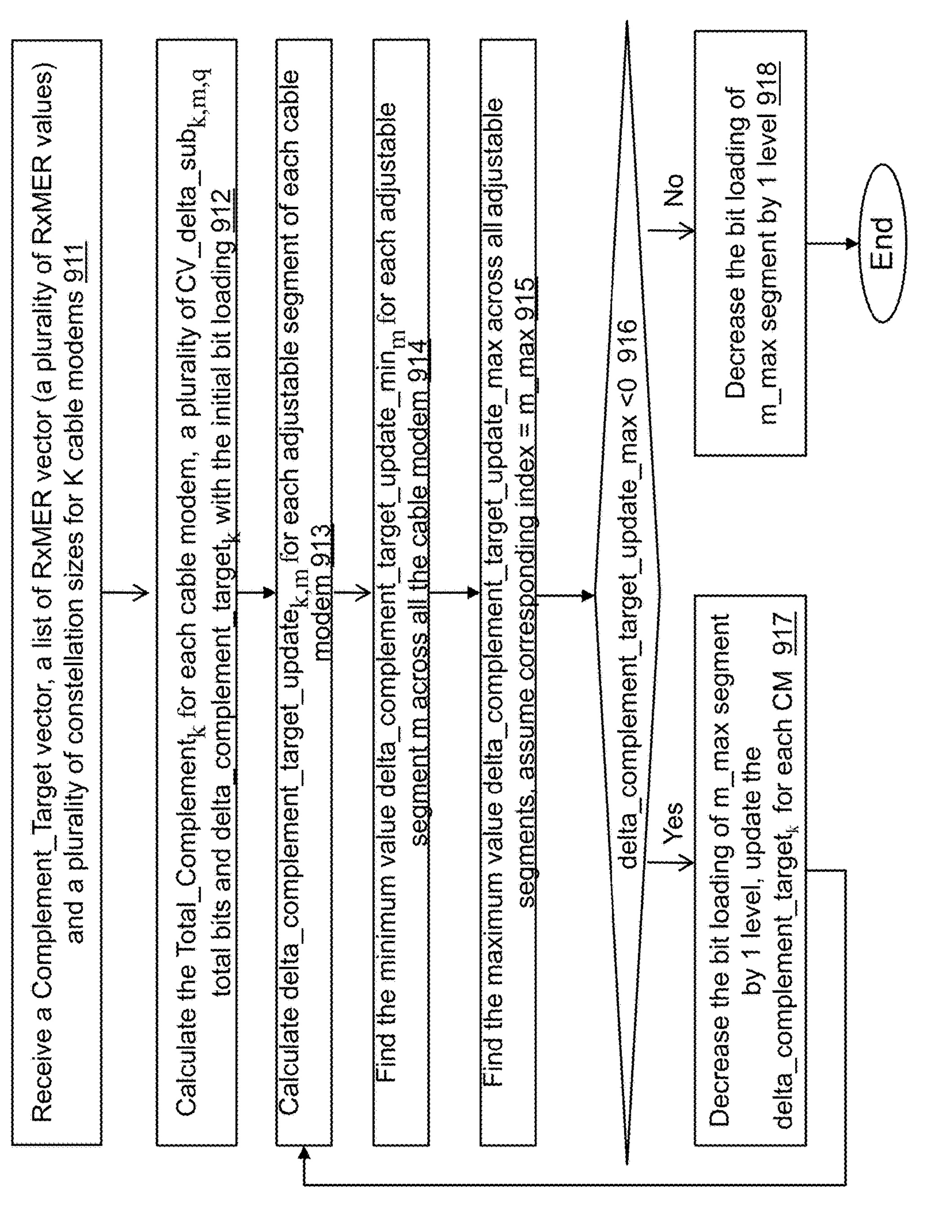
Figure 9C:
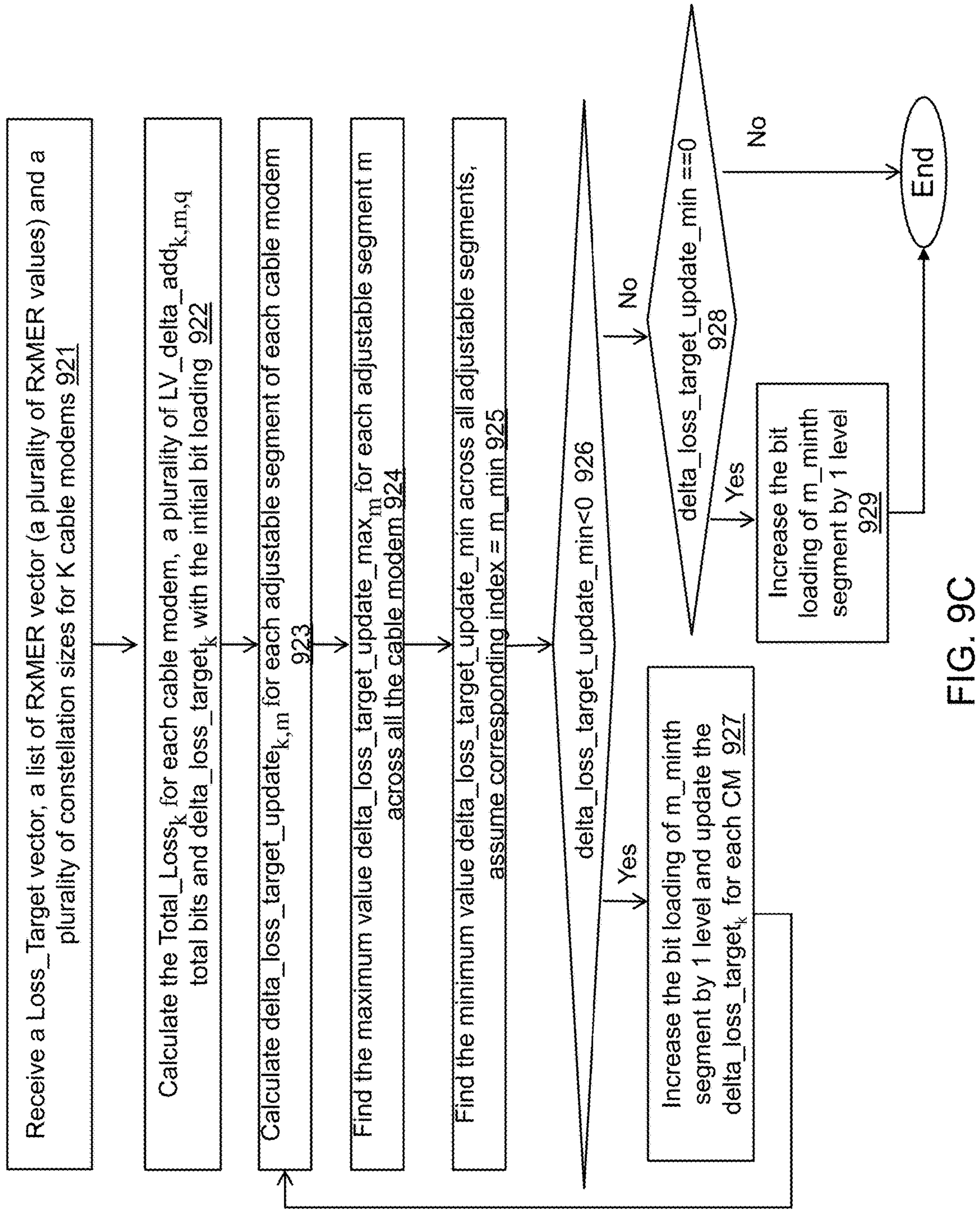
Figure 9D:
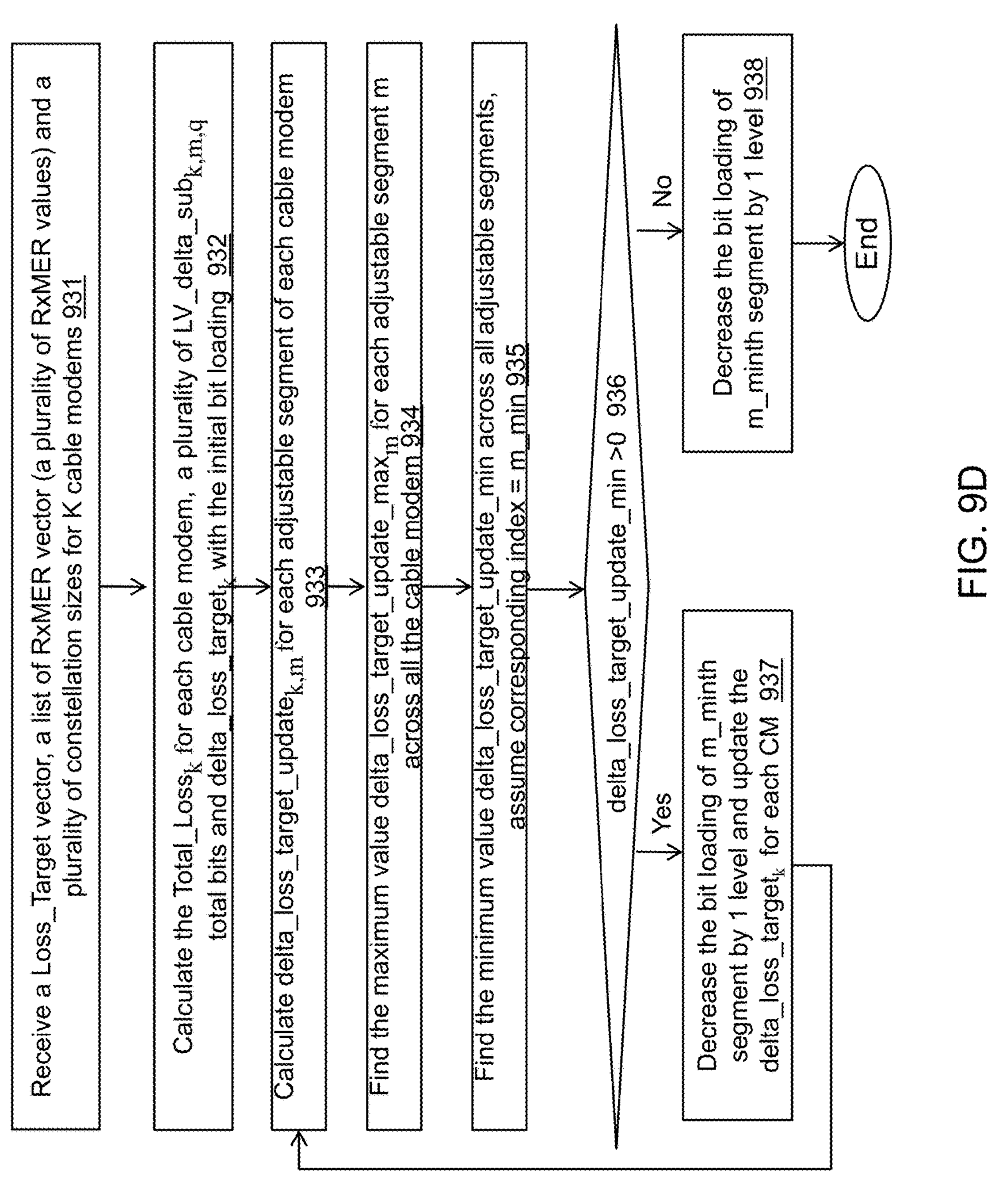

FIG. 8 is a flow diagram showing a process 800 for determining bit loading profiles for a plurality of cable modems (CMs), according to one or more embodiments. In some implementations, the process 800 is performed by one or more processors of a server (e.g. processor 2010 of server 320). In other embodiments, the process 800 is performed by other entities (e.g., a computing system other than the server 320). In some implementations, the process 800 includes more, fewer, or different steps than shown in FIG. 8.

At step 802, the one or more processors (e.g., one or more processors of a server 320) may identify a set of bit loading profiles (e.g., 16 profiles including profile 0, . . . , profile 15) and respective target bit rates of the plurality of CMs. A target bit rate of a CM may be determined using a service level of the CM (e.g., y-axis 501).

At step 804, the one or more processors may determine respective average bit rates of the plurality of CMs (e.g., bit rate data 402-1, 402-2, . . . , 402-*n*), wherein an average bit rate of a CM is an average net bit rate per subcarrier of the CM.

At step 806, the one or more processors may determine, using the set of bit loading profiles and the respective average bit rates of the plurality of CMs, a plurality of sets of CMs (e.g., Ne number of clusters in FIG. 6A) having a first order of sets (e.g., in the decreasing order of average bit rates).

At step 808, for each set of CMs in the first order, the one or more processors may determine, based at least on respective target bit rates of the CMs in the set, a plurality of subsets of CMs having a second order of subsets (e.g., four subsets including a customized easy subset 511, a standby easy subset 512, a customized hard subset 513, and a standby hard subset 514 in this order), and for each subset in the second order. The one or more processors may determine, from among the set of bit loading profiles, one or more bit loading profiles for corresponding CMs in the subset.

FIG. 9A, 9B, 9C, 9D are flow diagrams 900, 910, 920, 930 showing four different version of implementations for optimizing joint bit loading profile for a given group (subset or subgroup) of cable modems, in accordance with an embodiment.

The process 900 is performed by one or more processors of a server (e.g. processor 2010 of server 120, 320). In other embodiments, the process 900 is performed by other entities (e.g., a computing system other than the server 120, 320, for example CMTS). The process 900 can implement a iterative optimization algorithm for synthesizing joint bit loading for a group of CMs.

At step 901, At step 2-1, the system takes input data includes: an list of RxMER vectors (e.g., $RxMER_{k,n}$, where k is the CM index and n is the subcarrier index, $1 \le n \le Ns$; $1 \le k \le K$), a plurality of Complement_Target for the group of CMs (e.g., $Complement\_Target_k$ for CM k), and a plurality of the constellation sizes for CMs, which provides information regarding the location of the continuous pilots, physical layer link channel (PLC), excluded subcarriers, data subcarriers, etc.

At step 902, the system generates an initial group bit loading profile through the following steps and then based on it, compute a plurality of internal metrics needed for the optimization process.

$CV\_per\_bit_{k,m}$ denotes an averaged complement value per bit for mth segment of CM k with a bit loading $BL_{k,m}$, and RxMER vector (e.g., $RxMER\_Vec_{k,m}$) corresponding to the data subcarriers in mth segment. The system can calculate $CV\_per\_bit_{k,m}$ using Equation 7, and for a given $RxMER\_Vec_{k,m}$, $CV\_per\_bit_{k,m}$ decreases as $BL_{k,m}$ increases.

The system can generate an initial bit loading $BL_{k,m}$ by assigning a maximum constellation size that maintains $CV\_per\_bit_{k,m}$ to be greater or equal to $Complement\_Target_k$, which means with the initial bit loading $BL_{k,m}$, increase the bit loading of any segment by 1 level can cause that segment's $CV\_per\_bit_{k,m}$ to be less than $Complement\_Target_k$.

The system can then generate the initial group bit loading $BLG_m$ for mth segment by taking the minimum value of $BL_{k,m}$, which means with the initial bit loading $BLG_m$, the complement value per bit for the initial bit loading is higher or equal to the $Complement\_Target_k$ of all the CMs in the group.

The system can set $BL_{k,m}=BLG_m$, and then compute $Total\_Complement_k$ using Equation 3 for each CM.

The system can compute $CV\_delta\_add_{k,m,q}$, the normalized differential increase in the averaged complement value of CM k when the mth segment has an increase in its bit loading $BLG_m$ from q−1th level to the qth level using Equation 5. For example, given the bit loading set equal to [0, 4, 6, 7, 8, 9, 10, 11, 12] bits, and $BLG_m=4$, the system can compute $CV\_delta\_add_{k,m,1}$, $CV\_delta\_add_{k,m,2}$, $CV\_delta\_add_{k,m,3}$, $CV\_delta\_add_{k,m,4}$, $CV\_delta\_add_{k,m,5}$ $CV\_delta\_add_{k,m,6}$, $CV\_delta\_add_{k,m,7}$ for bit loading increase of 1 level (e.g., 6 bits), 2 levels (e.g., 7 bits), 3 levels (e.g., 8 bits), 4 levels (e.g., 9 bits), 5 levels (e.g., 10 bits), 6 levels (e.g., 11 bits), 7 levels (e.g., 12 bits).

The system can compute Total_Bits of the initial group bit loading using Equation 8.

$delta\_complement\_target_k$ denotes the difference between $Total\_Complement_k$ and the product of $Complement\_Target_k$ and Total_Bits. The system can compute the initial value for it using Equation 9.

$delta\_complement\_target\_update_{k,m}$ denotes the updated $delta\_complement\_target_k$ for CMk, if the system increase the group bit loading $BLG_m$ at mth segment from $BL\_add_{k,m,q-1}$ bits to $BL\_add_{k,m,q}$ bits. At step 903, the system can compute $delta\_complement\_target\_update_{k,m}$ using Equation 10.

For those subcarriers which already use the highest QAM modulation in the group bit loading, no additional bit adjustment is needed, therefore, $delta\_complement\_target\_update_{k,m}$ is set to $delta\_complement\_target_k$ for them at step 903, and they are excluded from comparison in step 904 and 905.

At step 904, the system can compute the minimum value of $delta\_complement\_target\_update_{k,m}$ across all CMs at a given segment m using Equation 11.

At step 905, the system can compute the maximum value of $delta\_complement\_target\_update\_min_m$ across all adjustable segments using Equation 12 and denotes the segment index where the maximum value is as m_max.

At step 906, the system can evaluate the inequity defined in Equation 13.

If the inequity of Equation 13 is true, at step 907, the system can increase group bit loading $BLG_{m\_max}$ at subcarrier m_max by 1 level, set $delta\_complement\_target_k$ $delta\_complement\_target\_update_{k,m\_max}$. increase the q counter of $CV\_delta\_sub_{k,m\_max,q}$ and $BL\_sub_{k,m\_max,q}$ by 1, and then return to step 903 to continue the iterative process of increasing the group bit loading.

If the inequity of Equation 13 is false, at step 908, the system may compare delta_complement_target_update_max against 0, if it equals 0, at step 909, the system can increase the group bit loading $BLG_{m\_max}$ at subcarrier m_max by 1 level and then end the iterative process. Otherwise, the system completes the iterative process directly without increasing the group bit loading.

The process 910 is performed by one or more processors of a server (e.g. processor 2010 of server 120, 320). In other embodiments, the process 900 is performed by other entities (e.g., a computing system other than the server 120, 320, for example CMTS). The process 910 can implement a iterative optimization algorithm for synthesizing joint bit loading for a group of CMs. The overall structure between 900 and 910 are similar, but the approach to initialize the group bit loading profile is different, thus the adjustment step is different (e.g., decrease the bit loading by 1 level rather than increase the bit loading by 1 level). Both processes use Complement_Value as optimization criteria, however, the internal computation metrics are quite different due to the difference in the adjustment steps.

At step 911, the input data can include an list of RxMER vectors (e.g., $RxMER_{k,n}$, where k is the CM index and n is the subcarrier index, 1≤n≤Ns; 1≤k≤K), a plurality of Complement_Target for the group of CMs (e.g., Complement_Target for CM k), and a plurality of the constellation sizes for CMs, which provides information regarding the location of the continuous pilots, physical layer link channel (PLC), excluded subcarriers, data subcarriers, etc. The group bit loading profile defines the bit loading on those data subcarriers.

At step 912, the system generates an initial bit loading for the group through the following steps and then based on it, compute a plurality of internal metrics needed for the optimization process.

$CV\_per\_bit_{k,m}$ denotes an averaged complement value per bit for mth segment of CM k with a bit loading $BL_{k,m}$, and RxMER vector (e.g., $RxMER\_Vec_{k,m}$) corresponding to the data subcarriers in mth segment. The system can calculate $CV\_per\_bit_{k,m}$ using Equation 7. For a given $RxMER\_Vec_{k,m}$, $CV\_per\_bit_{k,m}$ decreases as $BL_{k,m}$ increases.

the system can generate an initial bit loading $BL_{k,m}$ by assigning a minimum constellation size that maintains $CV\_per\_bit_{k,m}$ to be less than $Complement\_Target_k$ which means with the initial bit loading $BL_{k,m}$, decrease the bit loading of any subcarrier by 1 level can cause that subcarrier's $CV\_per\_bit_{k,m}$ to be greater or equal to $Complement\_Target_k$.

the system can generate the initial group bit loading $BLG_m$ for mth segment by taking the maximum value of $BL_{k,m}$ across all the CMs, which means with the initial bit loading $BLG_m$, the complement value per bit for the initial bit loading is less than the $Complement\_Target_k$ for each CM in the group.

The system can set $BL_{k,m}=BLG_m$, and then compute $Total\_Complement_k$ using Equation 3 for each CM k.

The system can compute $CV\_delta\_sub_{k,m,q}$, the normalized differential increase in the averaged complement value of CM k when the $m^{th}$ segment decreases its bit loading $BLG_m$ from q−1th level to the qth level using Equation 6. The system can compute $CV\_delta\_sub_{k,m,q}$ up to the lowest QAM modulation. For example, given the bit loading set equal to [0, 4, 6, 7, 8, 9, 10, 11, 12] bits, and $BLG_m=7$, the system can compute $CV\_delta\_sub_{k,m,1}$, $CV\_delta\_sub_{k,m,2}$, $CV\_delta\_sub_{k,m,3}$ for bit loading decrease of 1 level (e.g., 6 bits), 2 levels (e.g., 4 bits), 3 levels (e.g., 0 bits).

The system can compute Total_Bits of the initial group bit loading using Equation 8.

In some implementations, $delta\_complement\_target_k$ denotes the difference between $Total\_Complement_k$ and the product of $Complement\_Target_k$ and Total_Bits. The system can compute the initial value for it using Equation 9.

$delta\_complement\_target\_update_{k,m}$ denotes the updated $delta\_complement\_target_k$ for CMk, if the system decrease the group bit loading $BLG_m$ at mth segment from $BL\_sub_{k,m,q-1}$ bits to $BL\_sub_{k,m,q}$ bits. At step 913, the system can compute $delta\_complement\_target\_update_{k,m}$ for 1≤m≤M_seg, 1≤k≤K as follows:

$$delta\_complement\_target\_update_{k,m} = \frac{delta\_complement\_target_{k+}(CV\_delta\_sub_{k,m,q} - Complement\_Target_k) \times BL\_sub_{k,m,q} - BL\_sub_{k,m,q-1}) \times}{ND_{k,m}} \quad \text{(Equation 14)}$$

For those subcarriers which already use the lowest QAM modulation in the group bit loading, no additional bit adjustment is needed, therefore, $delta\_complement\_target\_update_{k,m}$ is set to $delta\_complement\_target_k$ for them in step 913, and they are excluded from comparison in step 914 and 915.

At step 914, the system can compute the minimum value of $delta\_complement\_target\_update_{k,m}$ across all CMs at a given segment m as defined in Equation 11.

At step 915, the system can compute the maximum value of $delta\_complement\_target\_update\_min_m$ across all segments as defined in Equation 12, and denotes the segment index where the maximum value is as m_max.

At step 916, the system can evaluate the inequity defined in Equation 15.

If the inequity of Equation 15 is true, at step 917, the system can decrease group bit loading $BLG_{m\_max}$ at subcarrier m_max by 1 level, set $delta\_complement\_target_k=delta\_complement\_target\_update_{k,m\_max}$, increase the q counter for $CV\_delta\_sub_{k,m\_max,q}$ and $BL\_sub_{k,m\_max,q}$ by 1, then return to step 913 to continue the iterative process of decreasing the group bit loading.

If the inequity of Equation 15 is false, at step 918, the system can decrease the group bit loading $BLG_{m\_max}$ at subcarrier m_max by 1 level and then complete the iterative process.

The process 920 is performed by one or more processors of a server (e.g., processor 2010 of server 120, 320). In other embodiments, the process 920 is performed by other entities (e.g., a computing system other than the server 120, 320, for example CMTS). The process 920 can implement a iterative optimization algorithm for synthesizing joint bit loading for a group of CMs. The process 920 uses different optimization criteria (e.g., using Loss_Value rather than Complement_Value), it computes Total_Loss value for each CM and compare against Loss_Target in the iteration process, therefore, the internal computed metrics are quite different from the process 900 and 910.

At step 921, the system takes input data, which may include: an list of RxMER vectors (e.g., $RxMER_{k,n}$, where k is the CM index and n is the subcarrier index, 1≤n≤Ns; 1<k≤K), a plurality of Loss_Target for the group of CMs (e.g., $Loss\_Target_k$ for CM k), and a plurality of the constellation sizes for CMs, which provides information regarding the location of the continuous pilots, physical layer link channel (PLC), excluded subcarriers, data subcarriers, etc.

At step 922, the system can generate an initial bit loading for the group through the following steps and then based on it, compute a plurality of internal metrics needed for the optimization process.

$LV\_per\_bit_{k,m}$ denotes a loss value per bit for mth segment of CM k with a bit loading $BL_{k,m}$, and RxMER Vector (e.g., $RxMER\_Vec_{k,m}$) corresponding to the data carriers in $m^{th}$ segment. The system can calculate $LV\_per\_bit_{k,m}$ using Equation 16. For a given $RxMER\_Vec_{k,m}$, $LV\_per\_bit_{k,m}$ increases as $BL_{k,m}$ increases.

The system can generate an initial bit loading $BL_{k,m}$ by assigning a maximum constellation size that maintains $LV\_per\_bit_{k,m}$ to be less than $Loss\_Target_k$, which means with the initial bit loading $BL_{k,m}$, increase the bit loading of any subcarrier by 1 level can cause that subcarrier's $LV\_per\_bit_{k,m}$ to be greater or equal to $Loss\_Target_k$.

The system can generate the initial group bit loading $BLG_m$ for $m^{th}$ segment by taking the minimum value of $BL_{k,m}$ across all the CMs, which means with the initial bit loading $BLG_m$, the loss value per bit for the initial bit loading is greater than the $Loss\_Target_k$ for each CM in the group.

The system can set $BL_{k,m}=BLG_m$, and then compute $Total\_Loss_k$ using Equation 2 for each CM k.

$LV\_add_{k,m,q}$ denotes an averaged loss value when the mth segment of CM k has an increase in its bit loading by q levels (e.g., from 0 bit to 4 bits, 4 bits to 6 bits and 6 bits to 7 bits are all considered as increasing by 1 level given the bit loading set equal to [0, 4, 6, 7, 8, 9, 10, 11, 12] bits). $LV\_delta\_add_{k,m,q}$ denotes an normalized differential increase in the averaged loss value of segment m for CM k when the mth segment has an increase in its bit loading $BL_{k,m}$ from q−1th level to the qth level, it can be computed using Equation 17.

$BL\_add_{k,m,q}$-$BL\_add_{k,m,q}$-1 equals the number of bits increase between the two adjacent QAM modulation levels. For example, assume $BL_{k,m}=4$, then $BL\_add_{k,m,1}=6$, $BL\_add_{k,m,2}=7$, and $BL\_add_{k,m,2}-BL\_add_{k,m,1}=1$. The system can compute $LV\_delta\_add_{k,m,q}$ up to the highest QAM modulation. For example, given the bit loading set equal to [0, 4, 6, 7, 8, 9, 10, 11, 12] bits, and $BLG_m=9$, the system can compute $LV\_delta\_add_{k,m,1}$, $LV\_delta\_add_{k,m,2}$, $LV\_delta\_add_{k,m,3}$ for bit loading increase of 1 level (e.g., 10 bits), 2 levels (e.g., 11 bits), 3 levels (e.g., 12 bits). When q=0, $LV\_add_{k,m,0}=LV_{k,m}$.

The system can compute Total_Bits of the initial group bit loading using Equation 8.

$delta\_loss\_target_k$ denotes the difference between $Total\_Loss_k$ and the product of $Loss\_Target_k$ and Total_Bits. The system can compute the initial value for it using Equation 18.

In some implementations, $delta\_loss\_target\_update_{k,m}$ denotes the updated $delta\_loss\_target_k$ for CM k, if the system increase the group bit loading $BLG_m$ at mth segment from $BL\_add_{k,m,q-1}$ bits to $BL\_add_{k,m,q}$ bits. At step 923, the system can compute $delta\_loss\_target\_update_{k,m}$ for $1 \le m \le M\_seg$, $1 \le k \le K$ using Equation 19.

For those subcarriers which already use the highest QAM modulation in the group bit loading, no additional bit adjustment is needed, therefore, $delta\_loss\_target\_update_{k,m}$ is set to $delta\_loss\_target_k$ for them at step 923, and they are excluded from comparison in step 924 and 925.

At step 924, the system can compute the maximum value of $delta\_loss\_target\_update_{k,m}$ across all CMs at a given segment m using Equation 20.

At step 925, the system can compute the minimum value of $delta\_loss\_target\_update\_max_m$ across all adjustable segments using Equation 21, and denotes the segment index where the minimum value is as m_min.

At step 926, the system can evaluate the inequity defined in Equation 22.

If the inequity of Equation 22 is true, at step 927, the system can increase group bit loading $BLG_{m\_min}$ at subcarrier m_min by 1 level, set $delta\_loss\_target_k$ $delta\_loss\_target\_update_{k,m\_min}$. increase the q counter for $LV\_delta\_add_{k,m\_min,q}$ and $BL\_add_{k,m\_min,q}$ by 1, then return to step 923 to continue the iterative process of increasing the group bit loading.

If the inequity of Equation 22 is false, at step 928, the system compares delta_loss_target_update_min against 0. If delta_loss_target_update_min==0, at step 929, the system can increase the group bit loading $BLG_m$ min at subcarrier m_min by 1 level and then complete the iterative process. Otherwise, if delta_loss_target_update_min>0, the system completes the iterative process directly without increasing the group bit loading.

The process 930 is performed by one or more processors of a server (e.g. processor 2010 of server 120, 320). In other embodiments, the process 930 is performed by other entities (e.g., a computing system other than the server 120, 320, for example CMTS). The process 930 can implement a iterative optimization algorithm for synthesizing joint bit loading for a group of CMs. Like process 920 and different from process 900, 910, process 930 uses Loss_Value as the optimization criteria rather than Complement_Value, but the approach to initialize the group bit loading profile is different from process 920, thus the adjustment step is different (e.g., decrease the bit loading by 1 level rather than increase the bit loading by 1 level), and internal computation metrics are quite different due to the difference in the adjustment steps.

At step 931, the system takes input data, which may include: an list of RxMER vectors (e.g., $RxMER_{k,n}$ where k is the CM index and n is the subcarrier index, $1 \le n \le Ns$; $1 \le k \le K$), a plurality of Loss_Target for the group of CMs (e.g., $Loss\_Target_k$ for CM k), and a plurality of the constellation sizes for CMs, which provides information regarding the location of the continuous pilots, physical layer link channel (PLC), excluded subcarriers, data subcarriers, etc.

At step 932, the system may generate an initial bit loading for the group through the following steps and then based on it, compute a plurality of internal metrics needed for the optimization process.

$LV\_per\_bit_{k,m}$ denotes a loss value per bit for mth segment of CM k with a bit loading $BL_{k,m}$. and RxMER vector (e.g., $RxMER\_Vec_{k,m}$) corresponding to the data subcarriers in mth segment. The system can calculate $LV\_per\_bit_{k,m}$ using Equation 16. For a given $RxMER\_Vec_{k,m}$, $LV\_per\_bit_{k,m}$ increases as $BL_{k,m}$ increases.

The system can generate an initial bit loading $BL_{k,m}$ by assigning a minimum constellation size that maintains $LV\_per\_bit_{k,m}$ to be greater than $Loss\_Target_k$ which means with the initial bit loading $BL_{k,m}$, decrease the bit loading of any subcarrier by 1 level can cause that subcarrier's $LV\_per\_bit_{k,m}$ to be less or equal to $Loss\_Target_k$.

The system can generate the initial group bit loading $BLG_m$ for mth segment by taking the maximum value of $BL_{k,m}$ across all the CMs, which means with the initial bit loading $BLG_m$, the loss value per bit for the initial bit loading is greater than the $Loss\_Target_k$ for each CM in the group.

The system can set $BL_{k,m}=BLG_m$, and then compute $Total\_Loss_k$ using Equation 2 for each CM k.

$LV\_sub_{k,m,q}$ denotes an averaged loss value when the mth segment of CM k has an decrease in its bit loading by q levels (e.g., from 4 bit to 0 bits, 6 bits to 4 bits and 7 bits to 6 bits are all considered as decreasing by 1 level given the bit loading set equal to [0, 4, 6, 7, 8, 9, 10, 11, 12] bits). $LV\_delta\_sub_{k,m,q}$ denotes an normalized differential decrease in the averaged loss value of CM k when the $m^{th}$ segment has an decrease in its bit loading $BL_{k,m}$ from q−1th level to the qth level, it can be computed using Equation 23.

$BL\_sub_{k,m,q}$−$BL\_sub_{k,m,q}$=1 equals the number of bits decrease between the two adjacent QAM modulation levels. For example, assume $BL_{k,m}$=7, then $BL\_sub_{k,m,1}$=6, $BL\_sub_{k,m,2}$=4, and $BL\_add_{k,m,2}$−$BL\_add_{k,m,1}$=−2. The system can compute $LV\_delta\_sub_{k,m,q}$ up to the lowest QAM modulation. For example, given the bit loading set equal to [0, 4, 6, 7, 8, 9, 10, 11, 12] bits, and $BLG_m$=7, the system can compute $LV\_delta\_sub_{k,m,1}$. $LV\_delta\_sub_{k,m,2}$. $LV\_delta\_sub_{k,m,3}$ for bit loading decrease of 1 level (e.g., 6 bits), 2 levels (e.g., 4 bits), 3 levels (e.g., Obits). When q=0, $LV\_sub_{k,m,0}$=$LV_{k,m}$.

The system can compute Total_Bits of the initial group bit loading using Equation 8. $delta\_loss\_target_k$ denotes the difference between $Total\_Loss_k$ and the product of $Loss\_Target_k$ and Total_Bits. The system can compute the initial value for it using Equation 18.

$delta\_loss\_target\_update_{k,m}$ denotes the updated $delta\_loss\_target_k$ for CM k, if the system decrease the group bit loading $BLG_m$ at mth segment from $BL\_sub_{k,m,q}$-1 bits to $BL\_sub_{k,m,q}$ bits. At step 933, the system can compute $delta\_loss\_target\_update_{k,m}$ for 1≤m≤M_seg, 1≤k≤K using Equation 24.

For those subcarriers which already use the lowest QAM modulation in the group bit loading, no additional bit adjustment is needed, therefore, $delta\_loss\_target\_update_{k,m}$ is set to $delta\_loss\_target_k$ for them at step 933, and they are excluded from comparison in step 934 and 935.

At step 934, the system can compute the maximum value of $delta\_loss\_target\_update_{k,m}$ across all CMs at a given segment m using equation 20.

At step 935, the system can compute the minimum value of $delta\_loss\_target\_update\_max_m$ across all adjustable segments using Equation 21, and denotes the segment index where the minimum value is as m_min.

At step 936, the system can evaluate the inequity defined in Equation 25.

If the inequity of Equation 25 is true, at step 937, the system can decrease group bit loading $BLG_m$ min at subcarrier m_min by 1 level, set $delta\_loss\_target_k$=$delta\_loss\_target\_update_{k,m}$ min. increase the q counter for $LV\_delta\_sub_{k,m\_min,q}$ and $BL\_sub_{k,m\_min,q}$ by 1, then return to step 933 to continue the iterative process of decreasing the group bit loading.

If the inequity of Equation 25 is false, at step 938, the system can decrease the group bit loading $BLG_m$ min at subcarrier m_min by 1 level and then complete the iterative process.

In some implementations, the one or more processors (e.g., server 320) may be further configured to receive the respective average bit rates (e.g., data 351) from the plurality of CMs (e.g., CMs 300-1, . . . , **300-*n*). The one or more processors may send the one or more bit loading profiles (e.g., profiles 352-1, . . . , 352-*n***) to the corresponding CMs.

In some implementations, in determining the plurality of subsets of CMs, the one or more processors may determine the plurality of subsets of CMs using at least one of the respective target bit rates or respective channel impairments of the CMs in the set (e.g., easy or hard channel impairments).

In some implementations, the set of bit loading profiles may have corresponding target bit rates. In determining the plurality of sets of CMs, the one or more processors may determine, based on the target bit rates of the set of bit loading profiles, a target bit rate of each of the plurality of sets of CMs. The first order of sets may be a decreasing order of the target bit rates of the plurality of sets of CMs.

In some implementations, the set of bit loading profiles may include K different bit loading profiles where K is an integer greater than 1. The K bit loading profiles may have the corresponding K different target bit rates having (K−1) intervals between target bit rates. The plurality of sets of CMs may be (K−1) sets of CMs corresponding to the (K−1) intervals. Each of the (K−1) sets of CMs may be the target bit rate equal to a minimum target bit rate of the corresponding interval.

In some implementations, the plurality of subsets of CMs in each of the plurality of sets of CMs may include a first subset (e.g., a customized easy subset 511), a second subset (e.g., a standby easy subset 512), a third subset (e.g., a customized hard subset 513) and a fourth subset (e.g., a standby hard subset 514) in the second order. Each of CMs in the first subset and the third subset may have a target bit rate greater than or equal to the target bit rate of the set. Each of CMs in the second subset and the fourth subset may have a target bit rate smaller than the target bit rate of the set. Each of CMs in the first subset and the second subset may have a channel impairment metric greater than or equal to a first threshold. Each of CMs in the third subset and the fourth subset may have a channel impairment metric smaller than the first threshold.

In some implementations, for the first subset of a first set of CMs, the one or more processors may determine a first bit loading profile corresponding to the target bit rate of the first set. The one or more processors may determine, from among CMs in the first subset (e.g., customized easy subset or subgroup 511), a first group of CMs having a maximum number of CMs such that an average of the average bit rates of the CMs in the first group is greater than the target bit rate of the first set (e.g., continue to add a CM to the first group until the CMs in the first group generate an achievable group bit rate higher than the target bit rate of the cluster). The one or more processors may determine the first bit loading profile for the first group of CMs.

In some implementations, for the second subset (e.g., a standby easy subset 512), the third subset (e.g., a customized hard subset 513) or the fourth subset (e.g., a standby hard subset 514) of the first set of CMs, the one or more processors may determine whether a signal-to-noise ratio (SNR) margin of each CM in the second subset, the third subset or the fourth subset is greater than a second threshold. In response to determining that the SNR margin of a CM in the second subset, the third subset or the fourth subset is greater than the second threshold, the one or more processors may determine the first bit loading profile for the first group of CMs as the first bit loading profile for the CM in the second subset, the third subset or the fourth subset.

In some implementations, for the first subset of a second set of CMs (e.g., cluster 2) next to the first set of CM (e.g., cluster 1) in the first order, the one or more processors may determine a second bit loading profile corresponding to the target bit rate of the second set. The one or more processors may determine, from among (1) CMs in the first subset of the second set of CMs and (2) the CMs in the first subset of the first set of CMs that do not belong to the first group (e.g., left over or unassigned CMs in the previous cluster), a second group of CMs having a maximum number of CMs such that an average of the average bit rates of the CMs in the second group is greater than the target bit rate of the second set. The one or more processors may determine the second bit loading profile for the second group of CMs.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., STAs, APs, beamformers and/or beamformees) that can operate within a system or environment. It should be understood that the systems described above can provide multiple ones of any or each of those components and these components can be provided on either a standalone machine or, In some implementations, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system for determining bit loading profiles for a plurality of cable modems (CMs), the system comprising one or more processors configured to:

identify a set of bit loading profiles and respective target bit rates of the plurality of CMs, wherein a target bit rate of a CM is determined using a service level of the CM;

determine respective average bit rates of the plurality of CMs, wherein an average bit rate of a CM is an average net bit rate per subcarrier of the CM;

determine, using the set of bit loading profiles and the respective average bit rates of the plurality of CMs, a plurality of sets of CMs having a first order of sets; and for each set of CMs in the first order, determine, based at least on respective target bit rates of the CMs in the set, a plurality of subsets of CMs having a second order of subsets, and for each subset in the second order, determine, from among the set of bit loading profiles, one or more bit loading profiles for corresponding CMs in the subset.

2. The system of claim 1, wherein in determining the plurality of subsets of CMs, the one or more processors are configured to:

determine the plurality of subsets of CMs using at least one of the respective target bit rates or respective channel impairments of the CMs in the set.

3. The system of claim 1, wherein the set of bit loading profiles have corresponding target bit rates, and in determining the plurality of sets of CMs, the one or more processors are configured to:

determine, based on the target bit rates of the set of bit loading profiles, a target bit rate of each of the plurality of sets of CMs.

4. The system of claim 3, wherein the first order of sets is a decreasing order of the target bit rates of the plurality of sets of CMs.

5. The system of claim 3, wherein the set of bit loading profiles comprises K different bit loading profiles where K is an integer greater than 1, the K bit loading profiles have the corresponding K different target bit rates having (K−1) intervals between target bit rates, the plurality of sets of CMs are (K−1) sets of CMs corresponding to the (K−1) intervals, and each of the (K−1) sets of CMs has the target bit rate equal to a minimum target bit rate of the corresponding interval.

6. The system of claim 3, wherein the plurality of subsets of CMs in each of the plurality of sets of CMs comprise a first subset and a second subset, and each of CMs in the first subset and the second subset has a channel impairment metric greater than or equal to a first threshold.

7. The system of claim 6, wherein for the first subset of a first set of CMs, the one or more processors are configured to:

determine a first bit loading profile corresponding to the target bit rate of the first set;

determine, from among CMs in the first subset, a first group of CMs having a maximum number of CMs such that an average of the average bit rates of the CMs in the first group is greater than the target bit rate of the first set; and determine the first bit loading profile for the first group of CMs.

8. The system of claim 7, wherein the plurality of subsets of CMs in each of the plurality of sets of CMs further comprise a third subset and a fourth subset such that the first subset, the second subset, the third subset and the fourth subset in this order form the second order, each of CMs in the first subset and the third subset has a target bit rate greater than or equal to the target bit rate of the set, each of CMs in the second subset and the fourth subset has a target bit rate smaller than the target bit rate of the set, each of CMs in the third subset and the fourth subset has a channel impairment metric smaller than the first threshold, and for the second subset, the third subset or the fourth subset of the first set of CMs, the one or more processors are configured to:

determine whether a signal-to-noise ratio (SNR) margin of each CM in the second subset, the third subset or the fourth subset is greater than a second threshold; and in response to determining that the SNR margin of a CM in the second subset, the third subset or the fourth subset is greater than the second threshold, determine the first bit loading profile for the first group of CMs as the first bit loading profile for the CM in the second subset, the third subset or the fourth subset.

9. The system of claim 7, wherein for the first subset of a second set of CMs next to the first set of CM in the first order, the one or more processors are configured to:

determine a second bit loading profile corresponding to the target bit rate of the second set;

determine, from among (1) CMs in the first subset of the second set of CMs and (2) the CMs in the first subset of the first set of CMs that do not belong to the first group, a second group of CMs having a maximum number of CMs such that an average of the average bit rates of the CMs in the second group is greater than the target bit rate of the second set; and determine the second bit loading profile for the second group of CMs.

10. A system for determining bit loading profiles for a plurality of cable modems (CMS), the system comprising one or more processors configured to:

identify a set of bit loading profiles and respective target bit rates of the plurality of CMs, wherein a target bit rate of a CM is determined using a service level of the CM;

receive respective average bit rates from the plurality of CMs, wherein an average bit rate of a CM is an average net bit rate per subcarrier of the CM;

determine, using the set of bit loading profiles and the respective average bit rates of the plurality of CMs, a plurality of sets of CMs;

determine, using the plurality of sets of CMs, one or more bit loading profiles for corresponding CMs of the plurality of CMs; and send the one or more bit loading profiles to the corresponding CMs.

11. A method for determining bit loading profiles for a plurality of cable modems (CMs), the method comprising:

identifying, by one or more processors, a set of bit loading profiles and respective target bit rates of the plurality of CMs, wherein a target bit rate of a CM is determined using a service level of the CM;

determining, by the one or more processors, respective average bit rates of the plurality of CMs, wherein an average bit rate of a CM is an average net bit rate per subcarrier of the CM;

determining, by the one or more processors, using the set of bit loading profiles and the respective average bit rates of the plurality of CMs, a plurality of sets of CMs having a first order of sets; and for each set of CMs in the first order, determining, by the one or more processors, based at least on respective target bit rates of the CMs in the set, a plurality of subsets of CMs having a second order of subsets, and for each subset in the second order, determining, by the one or more processors, from among the set of bit loading profiles, one or more bit loading profiles for corresponding CMs in the subset.

12. The method of claim 11, further comprising:

receiving the respective average bit rates from the plurality of CMs; and sending the one or more bit loading profiles to the corresponding CMs.

13. The method of claim 11, wherein determining the plurality of subsets of CMs comprises:

determining the plurality of subsets of CMs using at least one of the respective target bit rates or respective channel impairments of the CMs in the set.

14. The method of claim 11, wherein the set of bit loading profiles have corresponding target bit rates, and determining the plurality of sets of CMs comprises:

determining, based on the target bit rates of the set of bit loading profiles, a target bit rate of each of the plurality of sets of CMs.

15. The method of claim 14, wherein the first order of sets is a decreasing order of the target bit rates of the plurality of sets of CMs.

16. The method of claim 14, wherein the set of bit loading profiles comprises K different bit loading profiles where K is an integer greater than 1, the K bit loading profiles have the corresponding K different target bit rates having (K−1) intervals between target bit rates, the plurality of sets of CMs are (K−1) sets of CMs corresponding to the (K−1) intervals, and each of the (K−1) sets of CMs has the target bit rate equal to a minimum target bit rate of the corresponding interval.

17. The method of claim 14, wherein the plurality of subsets of CMs in each of the plurality of sets of CMs comprise a first subset and a second subset, and each of CMs in the first subset and the second subset has a channel impairment metric greater than or equal to a first threshold.

18. The method of claim 17, further comprising:

for the first subset of a first set of CMs, determining a first bit loading profile corresponding to the target bit rate of the first set;

determining, from among CMs in the first subset, a first group of CMs having a maximum number of CMs such that an average of the average bit rates of the CMs in the first group is greater than the target bit rate of the first set; and determining the first bit loading profile for the first group of CMs.

19. The method of claim 18, wherein the plurality of subsets of CMs in each of the plurality of sets of CMs further comprise a third subset and a fourth subset such that the first subset, the second subset, the third subset and the fourth subset in this order form the second order, each of CMs in the first subset and the third subset has a target bit rate greater than or equal to the target bit rate of the set, each of CMs in the second subset and the fourth subset has a target bit rate smaller than the target bit rate of the set, each of CMs in the third subset and the fourth subset has a channel impairment metric smaller than the first threshold, and for the second subset, the third subset or the fourth subset of the first set of CMs, determining whether a signal-to-noise ratio (SNR) margin of each CM in the second subset, the third subset or the fourth subset is greater than a second threshold; and in response to determining that the SNR margin of a CM in the second subset, the third subset or the fourth subset is greater than the second threshold, determining the first bit loading profile for the first group of CMs as the first bit loading profile for the CM in the second subset, the third subset or the fourth subset.

20. The method of claim 18, further comprising:

for the first subset of a second set of CMs next to the first set of CM in the first order, determining a second bit loading profile corresponding to the target bit rate of the second set;

determining, from among (1) CMs in the first subset of the second set of CMs and (2) the CMs in the first subset of the first set of CMs that do not belong to the first group, a second group of CMs having a maximum number of CMs such that an average of the average bit rates of the CMs in the second group is greater than the target bit rate of the second set; and determining the second bit loading profile for the second group of CMs.

* * * * *